(12) United States Patent
Kitabayashi

(10) Patent No.: US 7,273,287 B2
(45) Date of Patent: Sep. 25, 2007

(54) OPTICAL DEVICE, PROJECTOR AND MANUFACTURING METHOD OF THE OPTICAL DEVICE

(75) Inventor: Masashi Kitabayashi, Horigane-mura (JP)

(73) Assignee: Seiko Epson Corporation, Tokyo (JP)

( * ) Notice: Subject to any disclaimer, the term of this patent is extended or adjusted under 35 U.S.C. 154(b) by 173 days.

(21) Appl. No.: 11/206,800

(22) Filed: Aug. 19, 2005

(65) Prior Publication Data

US 2006/0038967 A1    Feb. 23, 2006

(30) Foreign Application Priority Data

Aug. 23, 2004 (JP) ............... 2004-242803
Jun. 8, 2005 (JP) ............... 2005-168441

(51) Int. Cl.
*G03B 21/14* (2006.01)
(52) U.S. Cl. .................... 353/119; 353/100
(58) Field of Classification Search ............ 353/119, 353/100; 349/5
See application file for complete search history.

(56) References Cited

U.S. PATENT DOCUMENTS

| | | | | |
|---|---|---|---|---|
| 6,595,645 B2 * | 7/2003 | Shiraishi et al. | ............ | 353/57 |
| 6,616,282 B2 * | 9/2003 | Ozawa | ............ | 353/33 |
| 6,742,900 B2 * | 6/2004 | Fujimori | ............ | 353/119 |
| 6,796,660 B2 * | 9/2004 | Shiraishi et al. | ............ | 353/57 |
| 6,986,582 B2 * | 1/2006 | Kobayashi | ............ | 353/61 |
| 6,994,438 B2 * | 2/2006 | Uehara et al. | ............ | 353/119 |
| 7,004,589 B2 * | 2/2006 | Shimizu | ............ | 353/100 |
| 7,014,324 B2 * | 3/2006 | Jang | ............ | 353/101 |
| 7,118,222 B2 * | 10/2006 | Kitabayashi | ............ | 353/52 |
| 2004/0174503 A1 * | 9/2004 | Peng | ............ | 353/119 |

FOREIGN PATENT DOCUMENTS

JP    A 2002-244206    8/2002

* cited by examiner

Primary Examiner—William C. Dowling
(74) Attorney, Agent, or Firm—Oliff & Berridge, PLC

(57) ABSTRACT

An optical device body (440A) includes an electro-optic device (440B), a projection lens (445), and a supporting structure (446). The supporting structure (446) includes a supporting structure body (4461) attached on a base end of the projection lens (445), an upper mount (4462) and a lower mount (4463) respectively fixed on an upper surface and a lower surface of a cross dichroic prism (444), and spacers (4464) interposed between: the supporting structure (4461); and the upper mount (4462) and the lower mount (4463). The spacers (4464) are respectively disposed near four corners of a planar rectangular light irradiation surface of the cross dichroic prism (444).

14 Claims, 17 Drawing Sheets

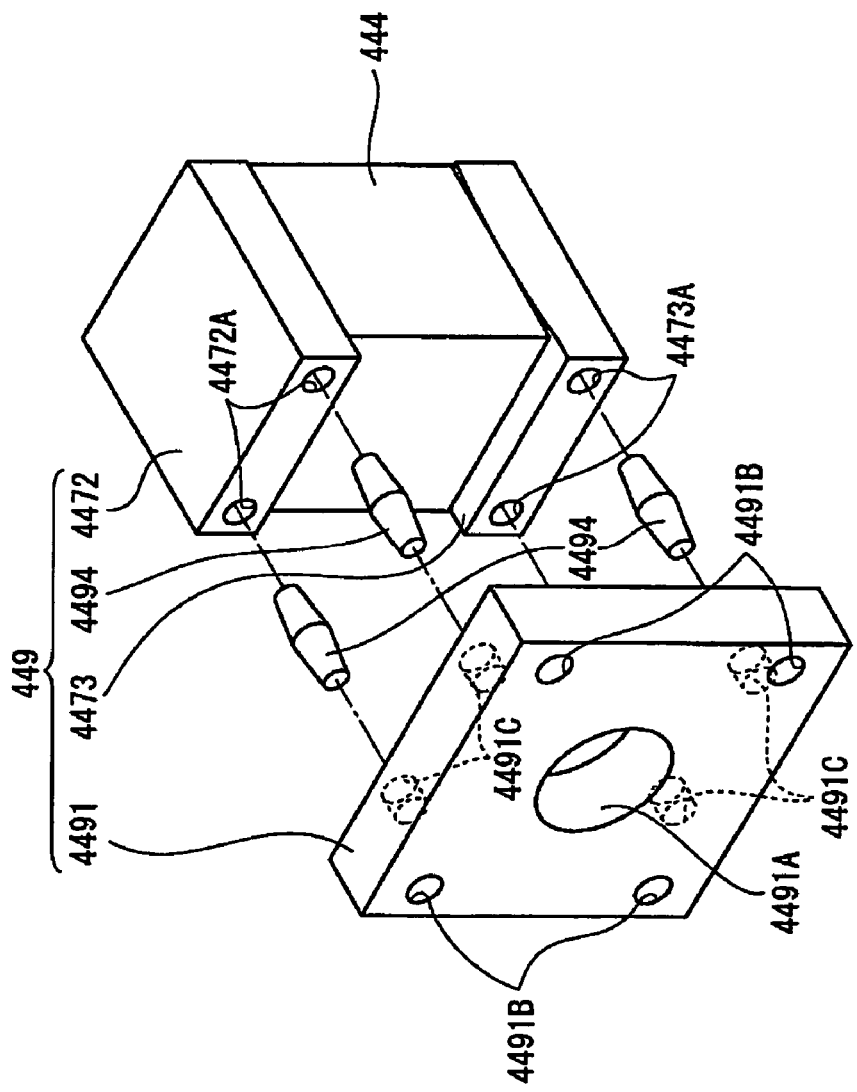

OPTICAL DEVICE, PROJECTOR AND MANUFACTURING METHOD OF THE OPTICAL DEVICE

BACKGROUND OF THE INVENTION

This application claims the benefit of Japanese Patent Applications No. 2004-242803 filed Aug. 23, 2004 and 2005-168441 filed Jun. 8, 2005. The entire disclosure of the prior applications is hereby incorporated by reference herein in its entirety.

1. Technical Field

The present invention relates to an optical device, a projector and a manufacturing method of the optical device.

2. Related Art

Recently, there has been known a front projector that forms a projection image on a front side (a viewer side) of a screen for home use such as home theater system.

As for the front projector, a three-plate type has been known. The three-plate type separates a light beam irradiated by a light source lamp into three color lights of R, G and B by a color-separating optical system such as a dichroic mirror, modulates each separated light beam in accordance with image information with three optical modulators per each color light, forms an optical image by combining the light beams modulated by each optical modulator by a cross dichroic prism as a color-combining optical device, and projects the optical image by a projection optical device such as a projection lens in an enlarged manner.

The three-plate type projector employs an electro-optic device in which the three optical modulators are directly attached on light incident surfaces of the cross dichroic prism for simplifying the structure as well as the assembling step.

In the above electro-optic device, when the optical modulators are fixed on the light incident surfaces of the cross dichroic prism, the positions of the optical modulators need to be relatively adjusted to prevent an image quality from deteriorating due to pixel misalignment among the respective optical modulators. Owing to this, there is proposed a manufacturing method of the electro-optic device in which the three optical modulators are relatively adjusted for their positions and fixed on the light incident surfaces of the cross dichroic prism by a manufacturing apparatus (for example, see Reference: JP2002-244206A).

Specifically, provided on the manufacturing apparatus described in the above Reference are an adjustment screen, an optical axis detector and four image detectors. The color-separating optical device, the cross dichroic prism, the optical modulators and an optical component casing for housing the former components are combined to be the adjusting target.

As for the manufacturing method, a projection lens with typical optical characteristics is selected as a master lens, and attached on the manufacturing apparatus. Next, the adjusting target is set on the manufacturing apparatus, an illumination optical axis is detected by the optical axis detector, and the four image detectors are moved based on the detected illumination optical axis, for detecting four corners of a projection image. Then, the light beam irradiated by the light source lamp of the manufacturing apparatus is used for forming the projection image on the adjustment screen, so that the positions of the optical modulators are respectively adjusted while the four corners of the projection image being detected by the image detector. After the position adjustment, the optical modulators are respectively fixed on the cross dichroic prism.

As for the projector, in addition to the front projector, a rear projector have gradually been popular, in which a projection image is formed on a back side of a transmissive screen, so that a viewer views an image transmitted through the screen.

The rear projector includes an internal unit for projecting an optical image, a boxy casing for housing a reflection mirror etc. that reflects the optical image projected by the internal unit and the exposed transmissive screen provided in front of the casing. The internal unit includes a light source lamp, a color-separating optical device, optical modulators, a cross dichroic prism and a projection optical device similar to the front projector.

Accordingly, even in the rear projector, it is desired to employ the electro-optic device like that of the front projector for simplifying the structure as well as the assembling step, and also the rear projector is possibly manufactured by using a conventional apparatus in manufacturing.

Incidentally, in particular to the rear projector, since a transmissive screen and an image formation portion are housed in the casing, an aspect ratio of a projection image projected from the image formation portion is required to highly accurately be positioned on a projection surface of the transmissive screen. Therefore, when manufacturing the electro-optic device for the rear projector by the manufacturing apparatus described in the Reference, the four image detectors have to be positioned corresponding to the four corners of the projection surface of the transmissive screen highly accurately. If the four image detectors are positioned in the above-described manner, by relatively adjusting the positions of the optical modulators and thus manufacturing the electro-optic device so that the four corners of the projection image can be detected by the four image detectors, the aspect ratio of the projection image projected from the internal unit can highly accurately be positioned on the projection surface of the transmissive screen when the manufactured electro-optic device is assembled with the rear projector.

However, when the above-described manufacturing method is conducted, positioning of the four image detectors takes long time, and consequently the electro-optic device cannot be manufactured easily.

In the manufacturing method using the master lens, since there is existed deviation of the optical characteristics such as the position of the back focus between the projection lens and the master lens combined with the electro-optic device, the aspect ratio of the projection image projected by the internal unit cannot highly accurately be positioned on the projection surface of the transmissive screen depending on the projection lens to be combined even when the electro-optic device is manufactured by the above-described manufacturing method. Owing to this, when manufacturing the electro-optic device, since the manufacturing target needs to include the projection lens to be combined with the electro-optic device, the electro-optic device cannot be manufactured independently and effectively.

SUMMARY

An advantage of some aspects of the invention is to provide an optical device, a projector and a manufacturing method of the optical device, which can easily manufacture an electro-optic device independently and set an aspect ratio of a projection image at a predetermined position even if the electro-optic device is combined with a projection lens.

An optical device according to an aspect of the invention includes: an electro-optic device including a plurality of optical modulators that modulate a plurality of color lights in accordance with image information and a color-combining optical device that has a plurality of light incident surfaces where the plurality of optical modulators are attached and combines the lights respectively modulated by the plurality of optical modulators to form an optical image; a projection optical device that projects the optical image formed by the electro-optic device in an enlarged manner; and a supporting structure that unitizes the electro-optic device and the projection optical device, the supporting structure including: a supporting structure body having an opening for passing the optical image irradiated from the electro-optic device and attached to a base end of the projection optical device; mounts respectively fixed on end surfaces intersecting the plurality of light incident surfaces of the color-combining optical device; and spacers interposed between the supporting structure body and the mounts, in which the light irradiation surface of the color-combining optical device is a planar rectangle, and the spacers are respectively disposed between the supporting structure body and the mounts near four corners of light irradiation surfaces of the color-combining optical device.

According to the above aspect of the invention, since the optical device includes the supporting structure having the supporting structure body, the mounts and the spacers, the position of the electro-optic device can be adjusted by the supporting structure relative to the projection optical device. The position adjustment may be conducted as follows.

For example, a first block is assembled by unitizing the electro-optic device and the mounts. Then, a second block is assembled by unitizing the projection optical device and the supporting structure. After this, the spacers are interposed between the mounts of the first block and the supporting structure body of the second block while a heat-curing adhesive or a light-curing adhesive is applied to the outer peripheries of the spacers. In this state, the light beam is introduced to the electro-optic device of the first block, so that the optical image projected by the projection optical device of the second block in an enlarged manner is projected on a screen. Based on the projection image on the screen, the first block is moved relative to the second block while the adhesive being uncured to adjust the position of the electro-optic device of the first block relative to the projection optical device of the second block. According to the position adjustment described above, the aspect ratio of the projection image can be set on the predetermined position. Owing to this, when manufacturing the electro-optic device, the four image detectors that detect the four corners of the projection image need not to be positioned highly accurately, thereby easily manufacturing the electro-optic device. Since the position of the electro-optic device can be adjusted by the supporting structure relative to the projection optical device, the projection lens to be combined with the electro-optic device need not be included in the manufacturing target, so that the conventional master lens can be utilized when manufacturing the electro-optic device, thereby effectively manufacturing the electro-optic device independently.

Further, since the spacers are respectively disposed near the four corners of the light irradiation surfaces of the color-combining optical device between the supporting structure body and the mounts, when assuming an optical axis direction of the projection optical device as Z-axis, and two axes orthogonal to the Z-axis as X-axis and Y-axis, the position of the electro-optic device can three-dimensionally be adjusted in the X-axis direction, the Y-axis direction, the Z-axis direction, the rotation direction around the X-axis, the rotation direction around the Y-axis, and the rotation direction around the Z-axis relative to the projection optical device. Therefore, the aspect ration of the projection image can be set on the predetermined position.

Preferably, in the above-described optical device, projections may be formed on a light incident surface of the supporting structure body so that the projections project on the light incident surface toward a light incident side at positions corresponding to the mounts, the projections having supporting surfaces for respectively supporting the two spacers, the spacers may be formed in triangle columns so that a column axis direction is orthogonal to the supporting surface and cross-section areas of the two spacers supported by the supporting surface become smaller as the spacers come closer to each other, and the mounts may be chamfered at respective corners near the four corners of an end facing to the supporting structure body and respectively have spacer setting portions where the spacers are set.

According to the above arrangement, since the projections are formed on the supporting structure body, the spacers can easily be set when manufacturing the optical device.

Additionally, since the spacers are triangle columns, disposed in the above-described manner, and the spacer setting portions are formed on the mounts, the position of the electro-optic device can three-dimensionally be adjusted relative to the projection optical device smoothly.

Further, according to the above profiles, if the heat-curing adhesive or the light-curing adhesive is applied to the outer peripheries of the spacers and the position of the electro-optic device can be adjusted relative to the projection optical device while the adhesive being uncured, the spacers likely follow the movement of the mounts because of the surface tension of the adhesive. Therefore, by curing the adhesive after the position adjustment, the fixture between the supporting structure body and the mounts via the spacers are preferably conducted.

Preferably, in the above-described optical device, spacer receivers may be respectively formed on the mounts, the spacer receivers being projected from the spacer setting portions and allowing the spacers to be sandwiched between the spacer receivers and the supporting surface of the supporting structure body.

According to the above arrangement, since the spacer receivers are formed on the mount, the spacers are sandwiched between the spacer receivers of the mount and the supporting surface of the supporting structure body, thus preferably maintaining the fixing state between the supporting structure body and the mounts via the spacers. Therefore, after manufacturing the optical device body, the state where the electro-optic device is disposed at the optimum position relative to the projection optical device can preferably be maintained.

Preferably, in the above-described optical device, the spacers may be formed with pin projections integrally formed on one of the supporting structure body and the mount and projected toward the other one of the supporting structure body and the mount, and spacer insertion holes may be respectively formed in the other one of the supporting structure body and the mount at positions corresponding to the spacers so that the spacers can be inserted through the spacer insertion holes in a loosely fitted manner.

According to the above arrangement, since the spacers are integrally formed on one of the supporting structure body and the mounts, a step for setting spacers can be omitted when manufacturing the optical device, thus quickly manufacturing the optical device. Additionally, since the spacer insertion holes are formed on the other one of the supporting structure body and the mounts, the position of the electro-optic device can smoothly be adjusted relative to the projection optical device while the spacers being inserted to the spacer insertion holes. Therefore, the spacers are not deviated relative to the supporting structure body or the mount, and the state where the electro-optic device is disposed on the optimum position relative to the projection optical device can preferably be maintained.

Preferably, in the above-described optical device, the spacer may have a cross-section area gradually becoming smaller to a tip end from a base end.

According to the above arrangement, since the spacers have the above profiles, when the position of the electro-optic device is adjusted relative to the projection optical device, the tip ends of the spacers hardly interfere with the inner surfaces of the spacer insertion holes mechanically, and therefore the position of the electro-optic device can further smoothly be adjusted relative to the projection optical device.

Preferably, in the above-described optical device, in which a bulged portion may be formed on one of the mounts respectively set on the end surfaces intersecting the plurality of light incident surfaces of the color-combining optical device substantially at the center of a fixture surface fixed to the color-combining optical device, the bulged portion being bulged from the fixture surface.

According to the above arrangement, if the mount with the bulged portion is set to the color-combining optical device when manufacturing the electro-optic device, the position of the color-combining optical device can be adjusted by tilting in the vertical direction, thus easily and appropriately manufacturing the electro-optic device. Additionally, if the mount is fixed when manufacturing the electro-optic device, a step for fixing the mount to the color-combining optical device can be omitted when unitizing the projection optical device and the electro-optic device, thus quickly manufacturing electro-optic device.

A projector according to another aspect of the invention includes: a light source device; and the above-described optical device.

The projector may be a front projector or a rear projector.

According to the above aspect of the invention, since the projector has the above-described light source device and optical device, the same effects and advantages as the above-described optical device can be obtained.

Preferably, the above-described projector may further include: a boxy exterior casing that houses the light source device and the optical device; and a transmissive screen exposed on one of lateral surfaces of the exterior casing for projecting an optical image formed by the optical device.

According to the above arrangement, since the projector has the optical device that can set the aspect ratio of the projection image on the predetermined position, the casing and the transmissive screen, the aspect ratio of the projection image projected by the optical device on the projection surface of the transmissive screen can preferably be adjusted. Therefore, the projection image can entirely be displayed on the projection surface of the transmissive screen.

A manufacturing method of an optical device according to still another aspect of the invention manufactures the optical device. The optical device includes: an electro-optic device having a plurality of optical modulators that modulate a plurality of color lights in accordance with image information and a color-combining optical device that has a plurality of light incident surfaces where the plurality of optical modulators are attached and combines the lights respectively modulated by the plurality of optical modulators to form an optical image; a projection optical device that projects an optical image formed by the electro-optic device in an enlarged manner; and a supporting structure that unitizes the electro-optic device and the projection optical device. The supporting structure includes: a supporting structure body having an opening for passing the optical image irradiated from the electro-optic device and attached to a base end of the projection optical device; mounts respectively fixed on end surfaces intersecting the plurality of light incident surfaces of the color-combining optical device; and four triangle columnar spacers interposed between the supporting structure and the mounts, in which projections are formed on a light incident surface of the supporting structure body so that the projections project on the light incident surface toward a light incident side at positions corresponding to the mounts, the projections having supporting surfaces for respectively supporting the two spacers, and the mounts are chamfered at respective corners near the four corners on a planar rectangular light irradiation surface of the color-combining optical device and respectively have spacer setting portions where the spacers are set. The method includes the steps of: a first block assembling step for assembling a first block by unitizing the plurality of optical modulators, the color-combining optical device and the mounts; a second block assembling step for assembling a second block by unitizing the projection optical device and the supporting structure body; a spacer setting step for, while a heat-curing adhesive or a light-curing adhesive is applied to outer peripheries of the four spacers, setting the four spacers respectively on the supporting surfaces of the projections of the supporting structure body of the second block so that the column axis direction of the spacers is orthogonal to the supporting surfaces and cross-section areas thereof gradually become smaller as the two spacers come closer to each other on the supporting surfaces; a second block setting step for setting the second block at a predetermined position; a first block setting step for holding the first block with an aspect ratio adjusting jig and setting the first block so that the four spacers are respectively abutted on the spacer setting portions of the mounts of the first block on the light incident side of the supporting structure body of the second block; a light beam introducing step for introducing a light beam to the plurality of optical modulators of the first block; an image forming step for projecting an optical image which is combined by the color-combining optical device via the plurality of optical modulators and projected by projection optical device of the second block on an image formation portion in an enlarged manner to form a projection image; an aspect ratio adjusting step for adjusting a position of the electro-optic device of the first block relative to the projection optical device of the second block by moving the aspect ratio adjusting jig according to the projection image formed by the image forming step; and an adhering and fixing step for fixing the supporting structure body and the mounts via the spacers by curing the heat-curing adhesive or the light-curing adhesive after the aspect ratio adjusting step.

According to the above aspect of the invention, since the manufacturing method of the optical device includes the first block assembling step, the second block assembling step, the second block setting step, the spacer setting step, the first block setting step, the light beam introducing step, the image forming step, the aspect ratio adjusting step, and the adhering and fixing step, the same effects and advantages can be obtained as the above-described optical device.

BRIEF DESCRIPTION OF THE DRAWINGS

The invention will be described with reference to the accompanying drawings, wherein like numbers reference like elements, and wherein:

FIG. 17 is an exploded perspective view showing another modification of the supporting structure of aforesaid embodiment.

DETAILED DESCRIPTION OF PREFERRED EMBODIMENT(S)

First Embodiment

A first embodiment of the invention will be described below with reference to the attached drawings.

[Major Components of Rear Projector]

Figure 1:
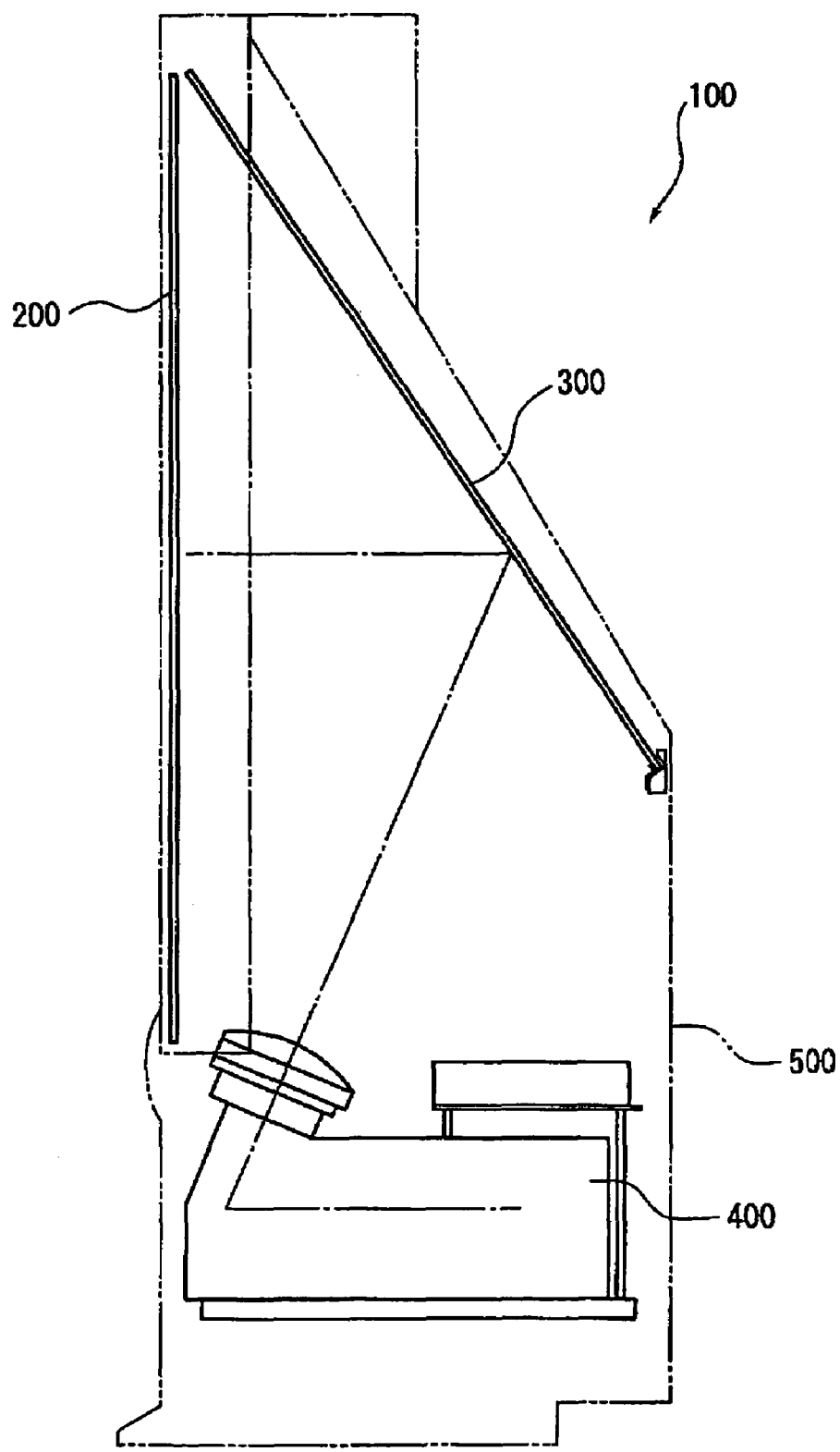
FIG. 1 is a cross-section in side view of a rear projector according to a first embodiment.
Figure 2:
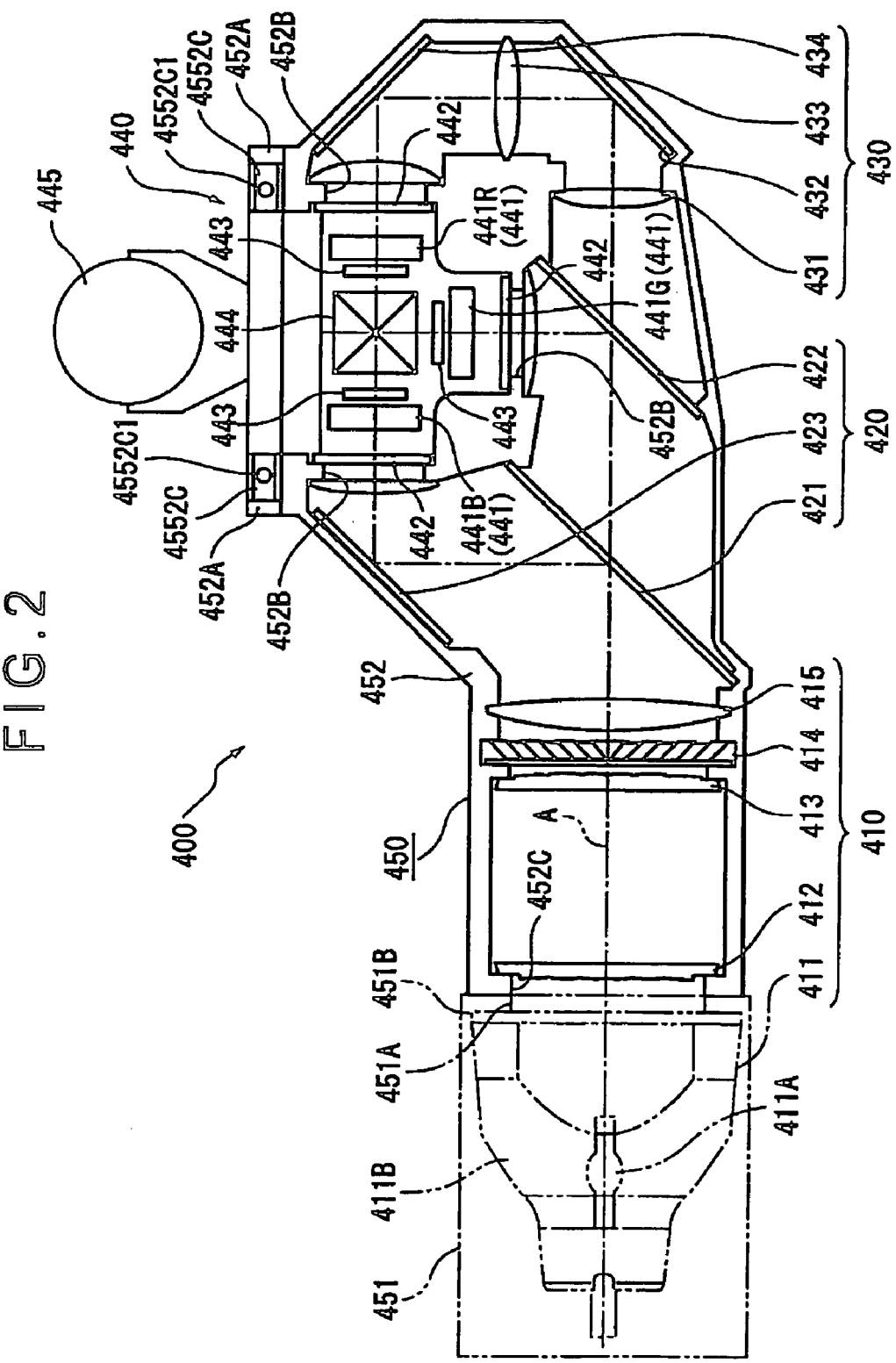
FIG. 2 is a plan view schematically showing an optical unit including an optical device assembled with the rear projector of aforesaid embodiment.

FIG. 1 is a cross-section in side view of a rear projector according to the first embodiment. FIG. 2 is a plan view schematically showing an optical unit including an optical device assembled with the rear projector.

In FIG. 1, the numeral 100 is a rear projector, the rear projector 100 mainly including an optical unit 400 that forms an optical image and projects it, a reflection mirror 300 that reflects the optical image projected by the optical unit 400, a transmissive screen 200 that projects the optical image reflected from the reflection mirror 300, and an exterior casing 500 in which the optical unit 400, the reflection mirror 300 and the transmissive screen 200 are disposed.

As shown in FIG. 2, the optical unit 400 includes an integrator illumination optical system 410, a color-separating optical device 420, a relay optical system 430, an optical device 440 and an optical component casing 450.

As shown in FIG. 2, the integrator illumination optical system 410 includes a light source device 411 provided with a light source lamp 411A and a reflector 411B, a first lens array 412, a second lens array 413, a polarization converter 414, and a superposing lens 415.

Light beams irradiated by the light source lamp 411A are aligned by the reflector 411B with respect to the irradiation direction, split into a plurality of sub-beams by the first lens array 412 and focused in the vicinity of the second lens array 413. The sub-beams irradiated by the second lens array 413 are converted into one type of polarized light by the polarization converter 414 and then incident on the superposing lens 415. The plurality of sub-beams irradiated by the superposing lens 415 are superposed on below-described optical modulators (liquid crystal panels) of the optical device 440.

As shown in FIG. 2, the color-separating optical device 420 has two dichroic mirrors 421 and 422, and a reflection mirror 423. The color-separating optical device 420 separates the plurality of sub-beams irradiated by the integrator illumination optical system 410 into three color lights of red (R), green (G) and blue (B) by the two dichroic mirrors 421 and 422.

As shown in FIG. 2, the relay optical system 430 includes an incident-side lens 431, a relay lens 433, and reflection mirrors 432 and 434, the relay optical system 430 guiding the color light (red light) separated by the color-separating optical device 420 toward a below-described optical modulator for red light of the optical device 440.

The optical device 440 modulates each of the three color lights irradiated by the color-separating optical device 420 in accordance with image information, combines each of the modulated color lights to form a color image, and projects it in an enlarged manner. As shown in FIG. 2, the optical device 440 includes three optical modulators 441 (hereafter, 441R for an optical modulator for red light, 441G for green light and 441B for blue light) provided with liquid crystal panels 4411 (see FIG. 3), an incident-side polarization plate 442 and an irradiation-side polarization plate 443 disposed on the light incident side and the light irradiation side of each optical modulator 441, a cross dichroic prism 444 as a color-combining optical device and a projection lens 445 as a projection optical device. The three optical modulators 441, the three irradiation-side polarization plates 443, the cross dichroic prism 444 and the projection lens 445 are unitized for defining an optical device body 440A (see FIG. 3). Note that, the specific configuration of the optical device body 440A will be described later. In the optical device body 440A, the three incident-side polarization plates 442 may also be unitized in addition to the three optical modulators 441, the three irradiation-side polarization plates 443 and the cross dichroic prism 444.

On the incident-side polarization plate 442, the color lights of which the polarization direction is substantially aligned to one direction by the polarization converter 414 are incident, so that only the polarized lights in the same direction as the polarization direction of the light beams aligned by the polarization converter 414 are transmitted through the incident-side polarization plate 442, and the light beams in other directions are absorbed thereby. The incident-side polarization plate 442 has a light-transmissive substrate made of sapphire glass, crystal or the like with a polarization film attached on the substrate.

Though not specifically shown, the liquid crystal panels 4411 of the optical modulators 441 each have a pair of transparent glass substrates with liquid crystal as electro-optic material sealed therebetween, so that the orientation of the liquid crystal is controlled according to a drive signal output from a control substrate (not shown) for modifying the polarization direction of the polarized light irradiated by the incident-side polarization plate 442.

The irradiation-side polarization plate 443 substantially has the same configuration as the incident-side polarization plate 442, namely, the irradiation-side polarization plate 443 passes the light beams with the polarization axis orthogonal to a transmission axis of the light beam of the incident-side polarization plate 442 and absorbs other light beams.

The cross dichroic prism 444 is an optical element that combines the optical image irradiated by the irradiation-side polarization plates 443 and modulated for each color light to form a color image. The cross dichroic prism 444 is square in plan view formed by attaching four right-angle prisms, two dielectric multi-layer films are formed on the boundaries where the right-angle prisms are attached to each other. These dielectric multi-layer films reflect the color light irradiated by the optical modulators 441R and 441B and passed through the irradiation-side polarization plate 443, and absorb the color light irradiated by the optical modulator 441G and passed through the irradiation-side polarization plate 443. In this way, the color lights respectively modulated by the optical modulators 441R, 441G and 441B are combined to form a color image.

The projection lens 445 is disposed on the light irradiation side of the cross dichroic prism 444, which enlarges the color image irradiated by the cross dichroic prism 444 and points the image to the reflection mirror 300, in other words, projects the color image irradiated forward by bending it upward. The projection lens 445 is selected from those having different projection angles according to the manufacture model of the rear projector 100, for instance, a screen size of the rear projector 100. The structure of the projection lens 445 will be described when the optical device body 440A is described in detail.

As shown in FIG. 2, a predetermined illumination optical axis A is set inside the optical component casing 450, and the above-described optical components 410 to 440 are disposed at predetermined positions relative to the illumination optical axis A. As shown in FIG. 2, the optical component casing 450 includes a light source housing 451, a component housing 452 and a lid member (not shown).

As shown in FIG. 2, the light source housing 451 is a casing for housing the light source device 411, which can connect the component housing 452.

In the light source housing 451, as shown in FIG. 2, an opening 451A is formed at the connection with the component housing 452 so that the light beam irradiated by the light source device 411 passes through it, and an anti-explosion glass 451B is attached to cover the opening 451A.

Further in the light source housing 451, though not shown particularly, a slit-like opening is formed for circulating air in and out of the light source housing 451, and the light source device 411 is cooled by air circulating via the opening.

As shown in FIG. 2, the component housing 452 is opened at an upper side, connected to the light source housing 451 at one end side, and formed like a U-shaped container in plan view at the other end side, the component housing 452 housing and disposing the above-described optical components 412 to 415, 421 to 423, 431 to 434 and 442 therein, and disposing the below-described optical device body 440A on a portion surrounded by the U-shaped container in plan view at the other end side.

As shown in FIG. 2, supporters 452A are formed at tip ends portion of the U-shaped container on the other end side of the component housing 452, which set and fix the optical device body 440A. An upper surface of the supporter 452A functions as a supporting surface, the optical device body 440A being set and fixed on the supporting surface. Though not shown, a fixing hole for setting and fixing the optical device body 440A is formed on the upper surface of the supporter 452A. In this way, when the optical device body 440A is set and fixed on the supporter 452A, as shown in FIG. 2, the three optical modulators 441, the three irradiation-side polarization plates 443 and the cross dichroic prism 444 are disposed on the portion surrounded by the U-shaped container on the other end side.

In the component housing 452, openings 452B for passing the light beam are formed on inner end surfaces of the U-shaped container on the other end side corresponding to light incident surfaces of the cross dichroic prism 444 disposed on the portion surrounded by the U-shaped container, and the incident-side polarization plates 442 are attached to cover the openings 452B.

In the component housing 452, an opening 452C for passing the light beam irradiated by the light source device 411 is formed on the one end, and the first lens array 412 is attached to cover the opening 452C.

Further, in the component housing 452, grooves and projections are formed on the inner surfaces of lateral sides so that the optical components 413 to 415, 421 to 423, and 431 to 434 are attached to the grooves and the projections.

The lid member covers the opening on the upper side of the component housing 452, its profile corresponding to a plane profile of the component housing 452.

The reflection mirror 300 is disposed on the rear surface side of the exterior casing 500 of the rear projector 100, which is a typical reflection mirror formed substantially in a trapezoidal profile. As shown in FIG. 1, the reflection mirror 300 reflects the color image projected by the optical unit 400 on the back side of the transmissive screen 200.

The transmissive screen 200 is a typical rectangular transmissive screen, for instance, formed with a diffusion plate, a Fresnel sheet, a lenticular sheet and a protection plate in that order from the back side thereof. The transmissive screen 200 projects the color image enlarged by the optical unit 400 and reflected by the reflection mirror 300 on the front side thereof from the back side.

[Configuration of Optical Device Body]

Figure 3:
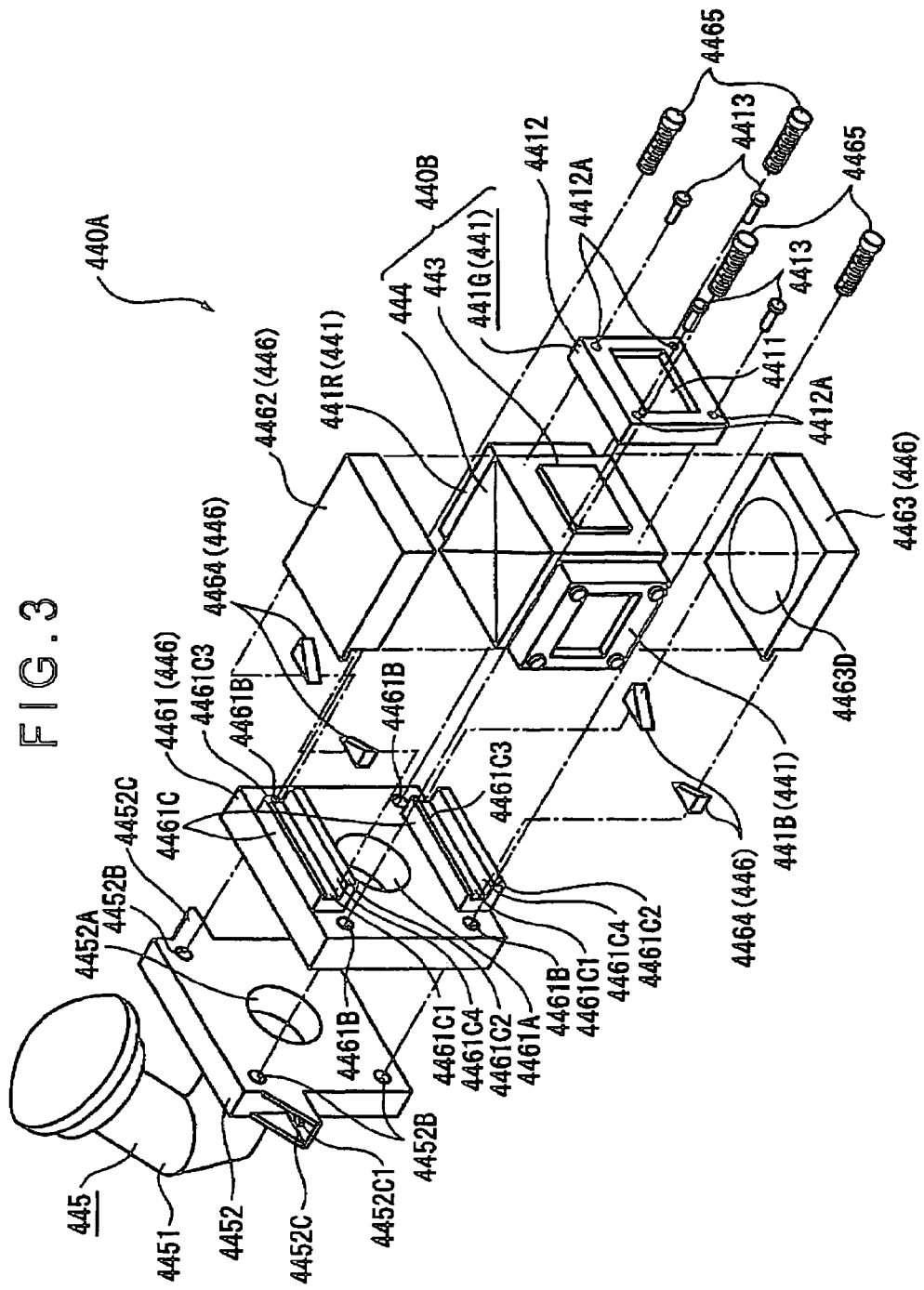
FIG. 3 is an exploded perspective view showing the configuration of an optical device body of aforesaid embodiment.

FIG. 3 is an exploded perspective view showing the configuration of the optical device body 440A.

The optical device body 440A includes: an electro-optic device 440B unitizing the three optical modulators 441, the three irradiation-side polarization plates 443 and the cross dichroic prism 444; the projection lens 445; and the supporting structure 446 unitizing the electro-optic device 440B and the projection lens 445.

[Configuration of Electro-Optic Device]

The electro-optic device 440B unitizes the three optical modulators 441, the three irradiation-side polarization plates 443 and the cross dichroic prism 444 in the manner described below.

As shown in FIG. 3, the three irradiation-side polarization plates 443 are bonded on the light incident surfaces of the cross dichroic prism 444 with an adhesive or the like. Note that, although only the irradiation-side polarization plate 443 for green light is shown in FIG. 3, the irradiation-side polarization plates 443 for blue and red lights are also bonded on the light incident surfaces of the cross dichroic prism 444.

As shown in FIG. 3, the three optical modulators 441 house the liquid crystal panels 4411 respectively within holder frames 4412. The holder frames 4412 are bonded and fixed on the light incident surfaces of the cross dichroic prism 444 by inserting pins 4413 made of transparent resin to holes 4412A formed on the respective four corners of the holder frames 4412 with an ultraviolet-curing adhesive.

In this way, the three optical modulators 441, the three irradiation-side polarization plates 443 and the cross dichroic prism 444 are unitized.

[Configuration of Projection Lens]

As shown in FIG. 3, the projection lens 445 houses a plurality of lenses and mirrors within the lens barrel 4451 for deflecting the incident light beam.

As shown in FIG. 3, the lens barrel 4451 extends horizontally, bends upward at the tip end, and has a flange 4452 at the base end.

As shown in FIG. 3, the flange 4452 is formed with a rectangular plate in plan view, which connects the supporting structure 446 and fixes the unitized optical device body 440A on the optical component casing 450.

As shown in FIG. 3, a circular opening 4452A is formed substantially at the center in plan view of the flange 4452 for passing the optical image irradiated by the electro-optic device 440B.

As shown in FIG. 3, the fixing holes 4452B are respectively formed at the four corners of the flange 4452 for connecting the supporting structure 446.

As shown in FIG. 3, provided on opposed positions on the upper both horizontal edges of the flange 4452 are a pair of standing pieces 4452C for fixing the optical device body 440A on the optical component casing 450, the standing pieces 4452C extending in a direction away from each other.

These standing pieces 4452C each are formed to be a plane at a lower end surface, the lower end surface abutting on the supporting surface of the supporter 452A of the component housing 452 of the optical component casing 450. As shown in FIG. 2 or 3, a screw hole 4452C1 penetrating from the upper end surface and to lower end surface is formed in each of the standing pieces 4452C for fixing each of the standing pieces 4452C to the component housing 452.

[Configuration of Supporting Structure]

The supporting structure 446 unitizes the electro-optic device 440B and the projection lens 445 and allows the position of the electro-optic device 440B to be adjusted relative to the projection lens 445 when manufacturing the optical device body 440A. As shown in FIG. 3, the supporting structure 446 includes a supporting structure body 4461, an upper mount 4462, a lower mount 4463 and four spacers 4464.

As shown in FIG. 3, the supporting structure body 4461 is disposed on the light irradiation side of the electro-optic device 440B, which is formed with a rectangular plate in plan view.

As shown in FIG. 3, provided substantially at the center in plan view of the supporting structure body 4461 is a circular opening 4461A for passing the optical image irradiated by the electro-optic device 440B at the position corresponding to the opening 4452A of the flange 4452.

As shown in FIG. 3, respectively formed at the four corners of the supporting structure body 4461 are fixing holes 4461B corresponding to the fixing holes 4452B of the flange 4452. The supporting structure body 4461 and the flange 4452 are connected and fixed by screwing fixing screws 4465 to the four fixing holes 4452B of the flange 4452 via the fixing holes 4461B of the supporting structure body 4461.

As shown in FIG. 3, supporters 4461C are formed on the upper end and the lower end of the light incident surface of the supporting structure body 4461.

The supporters 4461C respectively support the upper mount 4462 and the lower mount 4463. As shown in FIG. 3, these supporters 4461C project from the light incident surface toward the light irradiation side of the supporting structure body 4461, and extend parallel to the upper edge and the lower edge of the light incident surface.

As shown in FIG. 3, formed on each of the supporters 4461C at the end in the projecting direction is a cutout 4461C1 horizontally extending substantially at the center in the vertical direction. As shown in FIG. 3, the projecting dimension of a lower projection 4461C2 formed by the cutout 4461C1 is longer than that of an upper projection 4461C3. Though not clearly shown in FIG. 3, the dimension of the space between the projection 4461C2 and the projection 4461C3 is slightly larger than the thickness of the below-described spacers 4464.

The upper surface of the projection 4461C2 out of these projections 4461C2 and 4461C3 functions as a supporting surface 4461C4 for supporting the spacers 4464.

Figure 4:
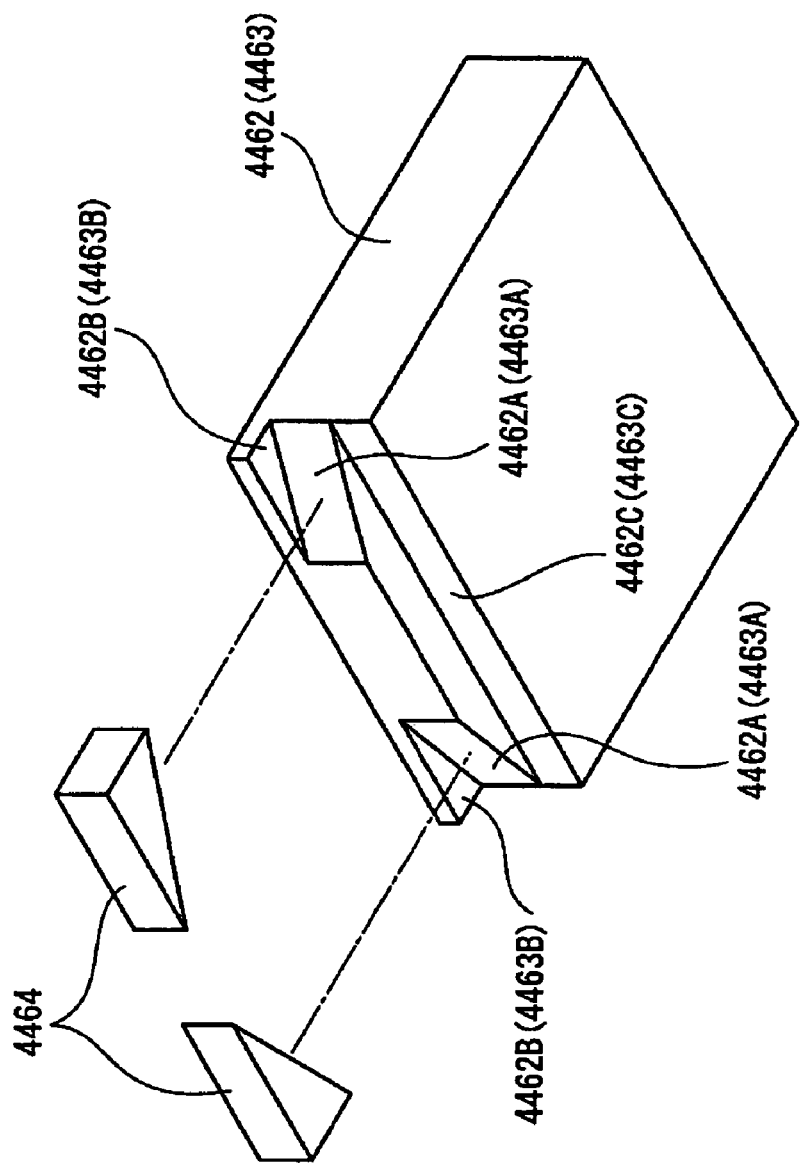
FIG. 4 is an explanatory diagram showing the profiles of an upper mount and a lower mount of aforesaid embodiment.

FIG. 4 is an explanatory diagram showing the profiles of the upper mount 4462 and the lower mount 4463. Specifically, FIG. 4 is a perspective view showing the upper mount 4462 or the lower mount 4463 as seen from the light irradiation side in bottom view.

As shown in FIG. 3, the upper mount 4462 is fixed on the upper surface which is an end surface intersecting the three light incident surfaces of the cross dichroic prism 444 of the electro-optic device 440B, the upper mount 4462 substantially being rectangular.

As shown in FIG. 4, the corners of the upper mount 4462 corresponding to the portions near the four corners of the light irradiation surface of the cross dichroic prism 444 are chamfered to have a plane orthogonal to the upper and lower surfaces of the upper mount 4462, and formed with spacer setting portions 4462A. As shown in FIG. 4, spacer receivers 4462B are formed on the upper side of the spacer setting portions 4462A to extend along the upper surface of the upper mount 4462. As shown in FIG. 4, a recess 4462C denting toward the light incident side and extending horizontally is formed on the lower side of the spacer setting portions 4462A, as a step.

The spacer setting portions 4462A and the spacer receivers 4462B are supported by the supporter 4461C of the supporting structure body 4461 via the below-described spacers 4464. The recess 4462C prevents the projection 4461C2 of the supporting structure body 4461 and the upper mount 4462 from mechanically interfering with each other while the upper mount 4462 is supported by the supporting structure body 4461.

As shown in FIG. 3, the lower mount 4463 is fixed on the lower surface which is an end surface intersecting the three light incident surface of the cross dichroic prism 444 of the electro-optic device 440B, the lower mount 4463 substantially being rectangular.

As shown in FIG. 4, the lower mount 4463 has the profile substantially same as the upper mount 4462, and includes spacer setting portions 4463A, spacer receivers 4463B, and a recess 4463C similar to the spacer setting portions 4462A, the spacer receivers 4462B and the recess 4462C of the upper mount 4462.

As shown in FIG. 3, a spherical bulged portion 4463D is formed substantially at the center of the upper surface of the lower mount 4463. By forming such bulged portion 4463D, the position of the cross dichroic prism 444 can be adjusted by tilting in the vertical direction while the cross dichroic prism 444 is abutted on the upper surface of the lower mount 4463.

As shown in FIG. 3, the four spacers 4464 are triangle columns respectively interposed between the cutout 4461C1 of the upper supporter 4461C of the supporting structure body 4461 and the two spacer setting portions 4462A of the upper mount 4462, and between the cutout 4461C1 of the lower supporter 4461C of the supporting structure body 4461 and the two spacer setting portions 4463A of the lower mount 4463.

The two spacers 4464 interposed between the cutout 4461C1 of the upper supporter 4461C and the two spacer setting portions 4462A of the upper mount 4462 are disposed so that the column axis is orthogonal to the supporting surface 4461C4 of the supporter 4461C and the cross-section areas become gradually smaller as being closer to each other. Other two spacers 4464 interposed between the cutout 4461C1 of the lower supporter 4461C and the two spacer setting portions 4463A of the lower mount 4463 are disposed in the above-described manner.

When manufacturing the optical device body 440A of such configuration, a manufacturing apparatus described below will be used.

[Structure of Manufacturing Apparatus of Optical Device Body]

Figure 5:
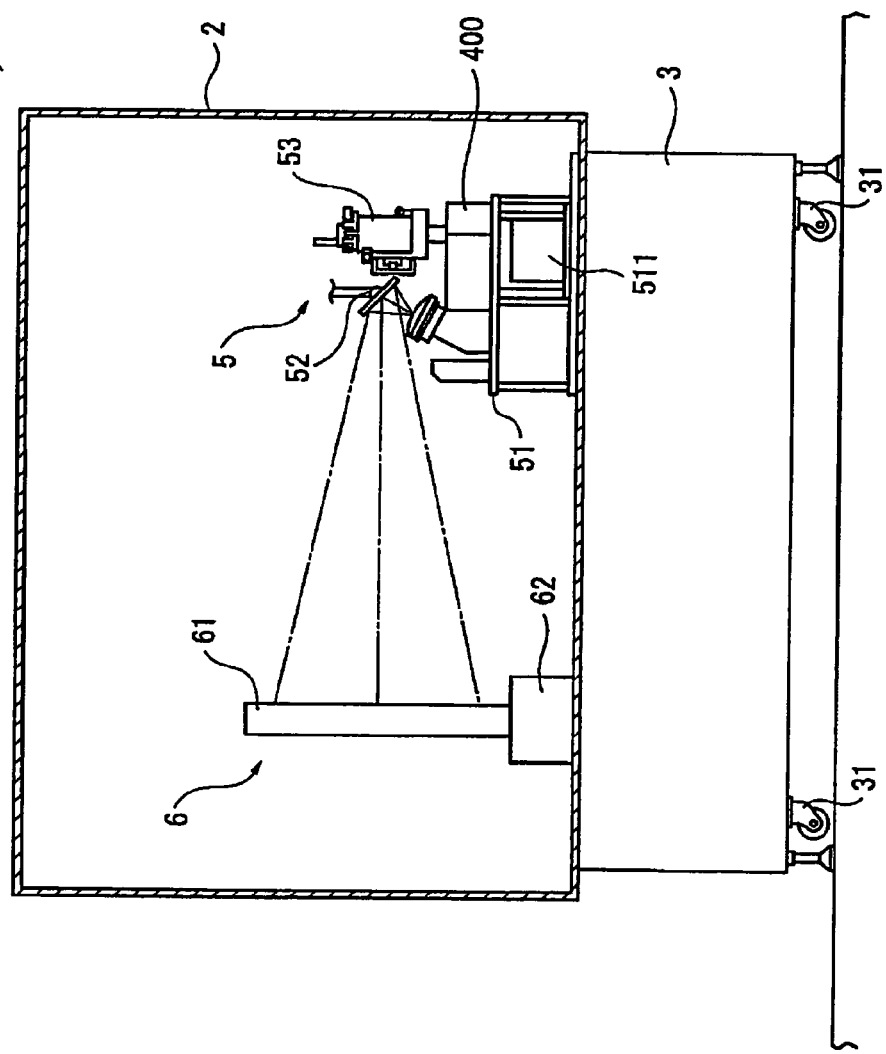
FIG. 5 is a side elevation showing a manufacturing apparatus of the optical device body of aforesaid embodiment.

FIG. 5 is a side elevation showing a manufacturing apparatus 1 of the optical device body 440A.

Figure 6:
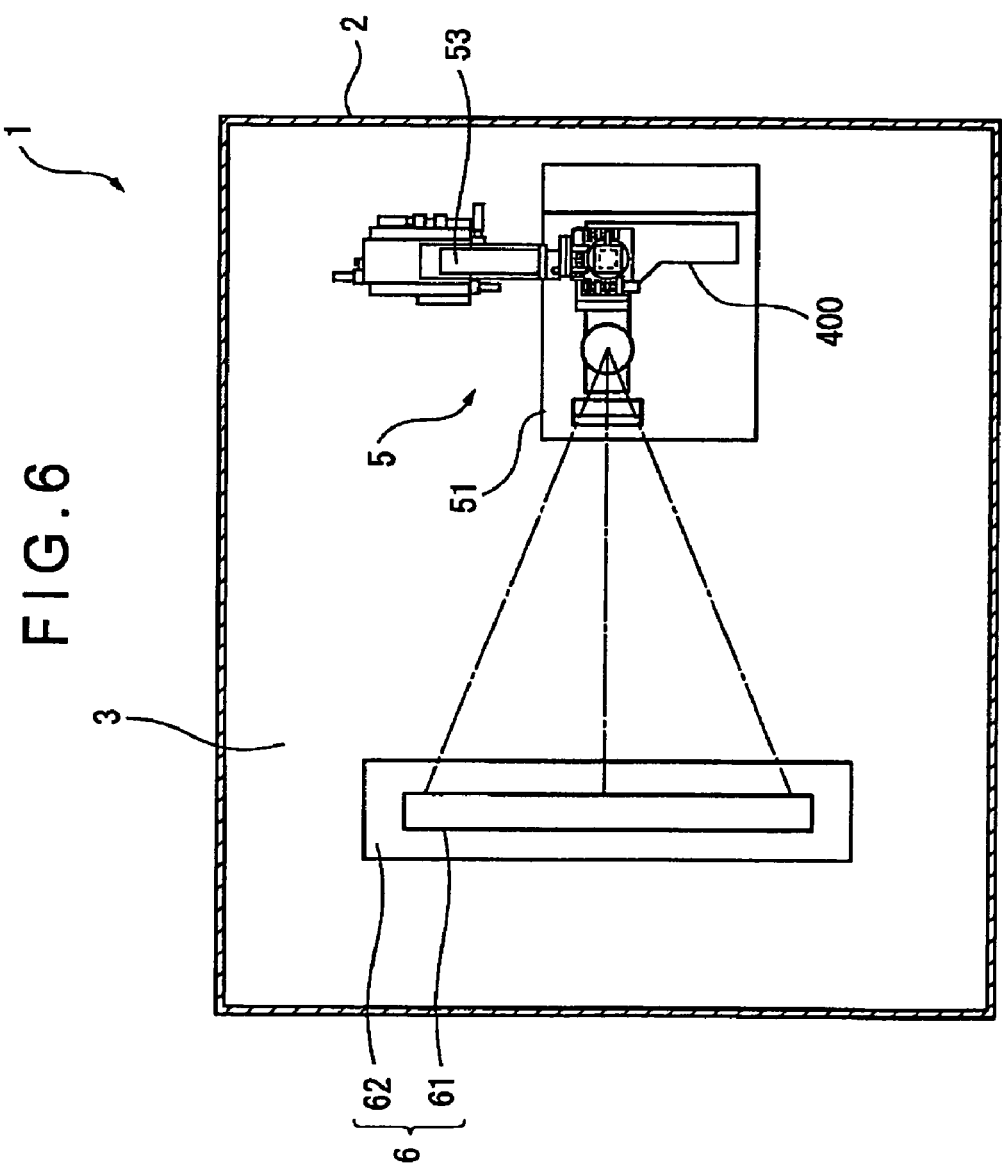
FIG. 6 is a plan view showing the manufacturing apparatus of the optical device body of aforesaid embodiment.

FIG. 6 is a plan view showing the manufacturing apparatus 1 of the optical device body 440A.

As shown in FIG. 5 or 6, the manufacturing apparatus 1 includes a light-shielding cover 2, a platform 3, an adjuster body 5 and a projection portion body 6.

[Structure of Light-Shielding Cover]

The light-shielding cover 2 is a cover for shielding light from outside, and is disposed to cover the adjuster body 5 and the projection portion body 6 as shown in FIG. 5 or 6. Though not shown, an openable/closable door is formed in the light-shielding cover 2, through which the optical unit 400 including the optical device body 440A as the adjusting target is carried-in and out.

The optical unit 400 including the optical device body 440A as the adjusting target is the one where the light source device 411 and the light source housing 451 are removed, as the same applies to the following description.

[Structure of Platform]

As shown in FIG. 5 or 6, on the platform 3, the light-shielding cover 2, the adjuster body 5 and the projection portion body 6 are mounted. Casters 31 (FIG. 5) are provided under the platform 3 so that the manufacturing apparatus 1 can easily move at installation of the manufacturing apparatus 1.

[Structure of Adjuster Body]

The adjuster body 5 introduces the light beam to the optical device body 440A as the adjusting target, reflects the optical image projected by the optical device body 440A toward the projection portion body 6, and adjusts the position of the electro-optic device 440B relative to the projection lens 445. As shown in FIG. 5 or 6, the adjuster body 5 includes a clamp jig 51, a mirror 52 (FIG. 5) and a position adjuster unit 53 as an aspect ratio adjusting jig.

On the upper surface of the clamp jig 51, the optical unit 400 including the optical device body 440A as the adjusting target is set so that the light beam projected by the projection lens 445 to the projection portion body 6 is located on a predetermined optical axis. A light source unit 511 are disposed inside the clamp jig 51.

Figure 7:
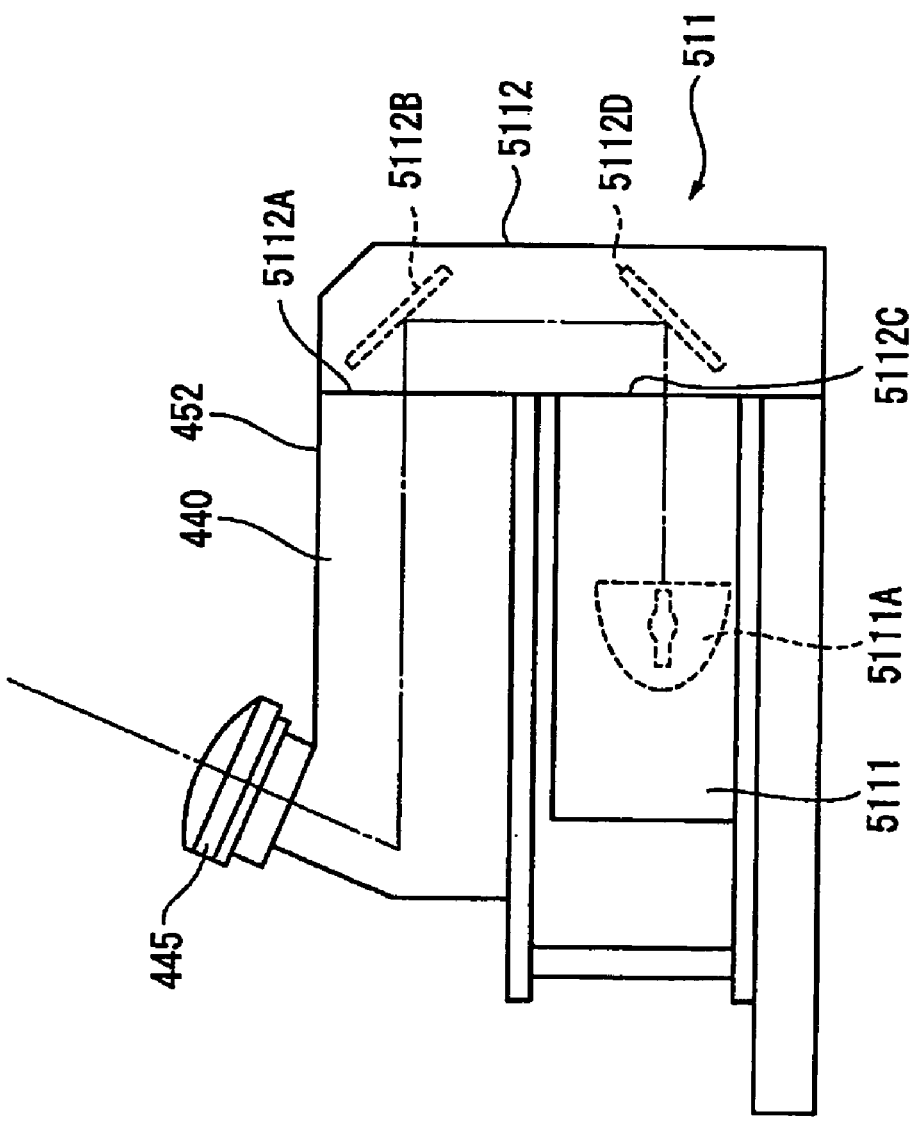
FIG. 7 is a side elevation showing the structure of a light source unit of aforesaid embodiment.

FIG. 7 is a side elevation showing the structure of the light source unit 511.

The light source unit 511 has a light source for adjusting the position of the electro-optic device 440B relative to the projection lens 445, the light source unit 511 including a light source body 5111 and a light guide 5112 as shown in FIG. 7.

As shown in FIG. 7, the light source body 5111 houses a light source lamp 5111A as an adjustment light source within a casing to supply the light beam to the optical unit 400 including the optical device body 440A as the adjusting target. Though not shown, the casing is provided with an opening for cooling the light source lamp 5111A and a cooling fan provided inside the opening.

As shown in FIG. 7, the light guide 5112 is formed with a tube extending vertically, and has an opening 5112A formed at the lateral side of the upper end and a mirror 5112B provided inside the tube at a position corresponding to the opening 5112A with approximately 45 degrees slanted against an opening plane of the opening 5112A.

An opening 5112C is formed at a position corresponding to the light irradiation portion of the light source lamp 5111A of the light source body 5111, and a mirror 5112D is disposed inside the light guide 5112 near the opening 5112C with approximately 45 degrees slanted against an opening plane of the opening 5112C.

When the position of the electro-optic device 440B is adjusted relative to the projection lens 445 with use of the light source unit 511, the opening 5112A of the upper portion of the light guide 5112 is abutting on the opening 452C (FIG. 2) of the component housing 452 of the optical unit 400 including the optical device body 440A as the adjusting target, and then the light beam irradiated by the light source lamp 5111A of the light source body 5111 is introduced inside the component housing 452.

The mirror 52 reflects the optical image which is projected by the optical device body 440A after the light beam is introduced from the light source unit 511, toward the projection portion body 6. The mirror 52 can change the angle of its reflection plane depending on the model, i.e. the projection angle of the projection lens 445 of the optical device body 440A as the adjusting target.

Figure 8:
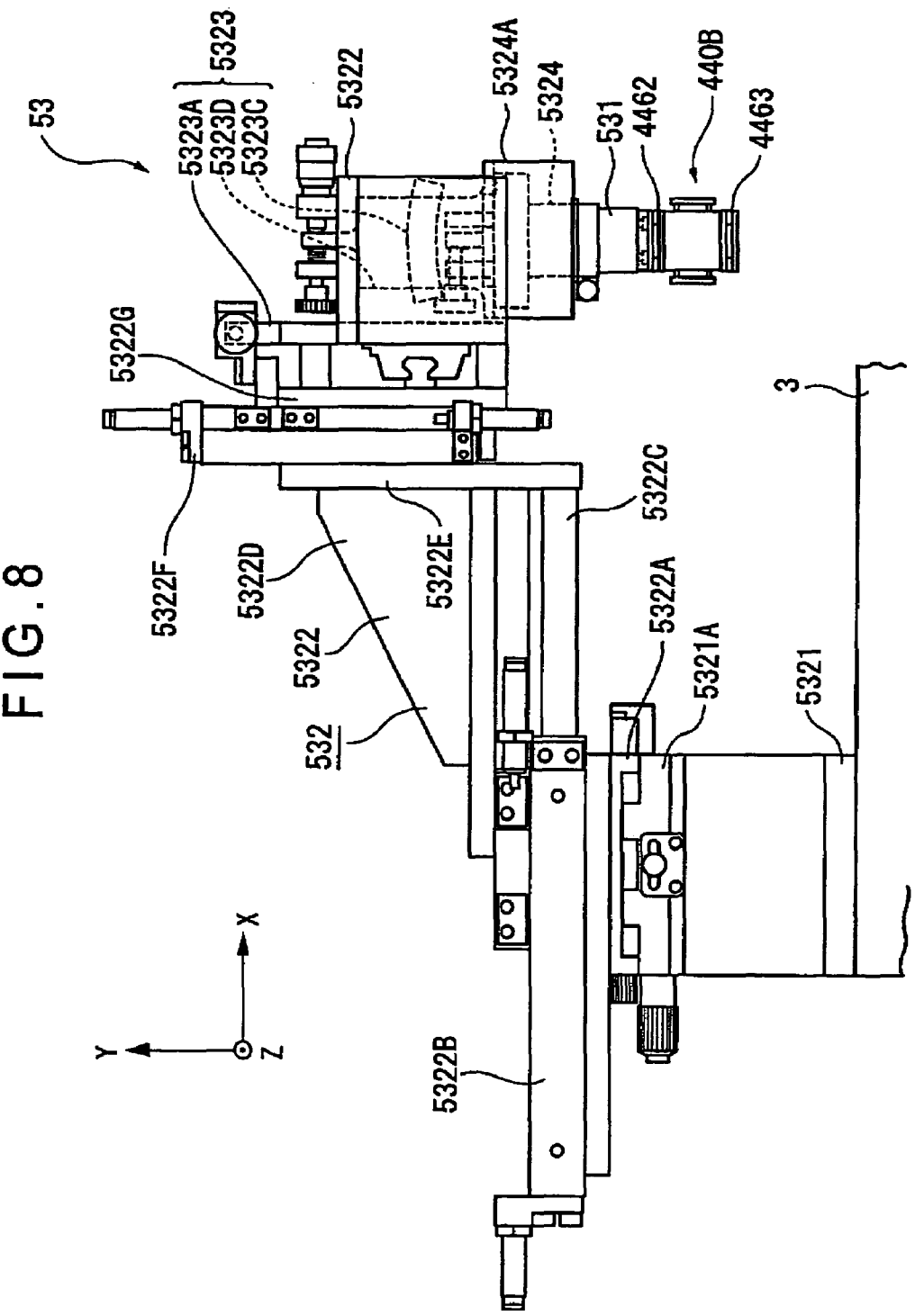
FIG. 8 is a side elevation showing the structure of a position adjuster unit of aforesaid embodiment.

FIG. 8 is a side elevation showing the structure of the position adjuster unit 53. Note that, in FIG. 8, the optical axis of the light beam incident on the projection lens 445 via the electro-optic device 440B is defined as Z-axis, and two axes orthogonal to the Z-axis are defined as X-axis and Y-axis for clear explanation. Hereinafter, the Z, X and Y-axes define the same.

The position adjuster unit 53 adjusts the position of the electro-optic device 440B relative to the projection lens 445. As shown in FIG. 8, the position adjuster unit 53 includes an electro-optic device holder 531 and a driving shaft 532.

Figure 9:
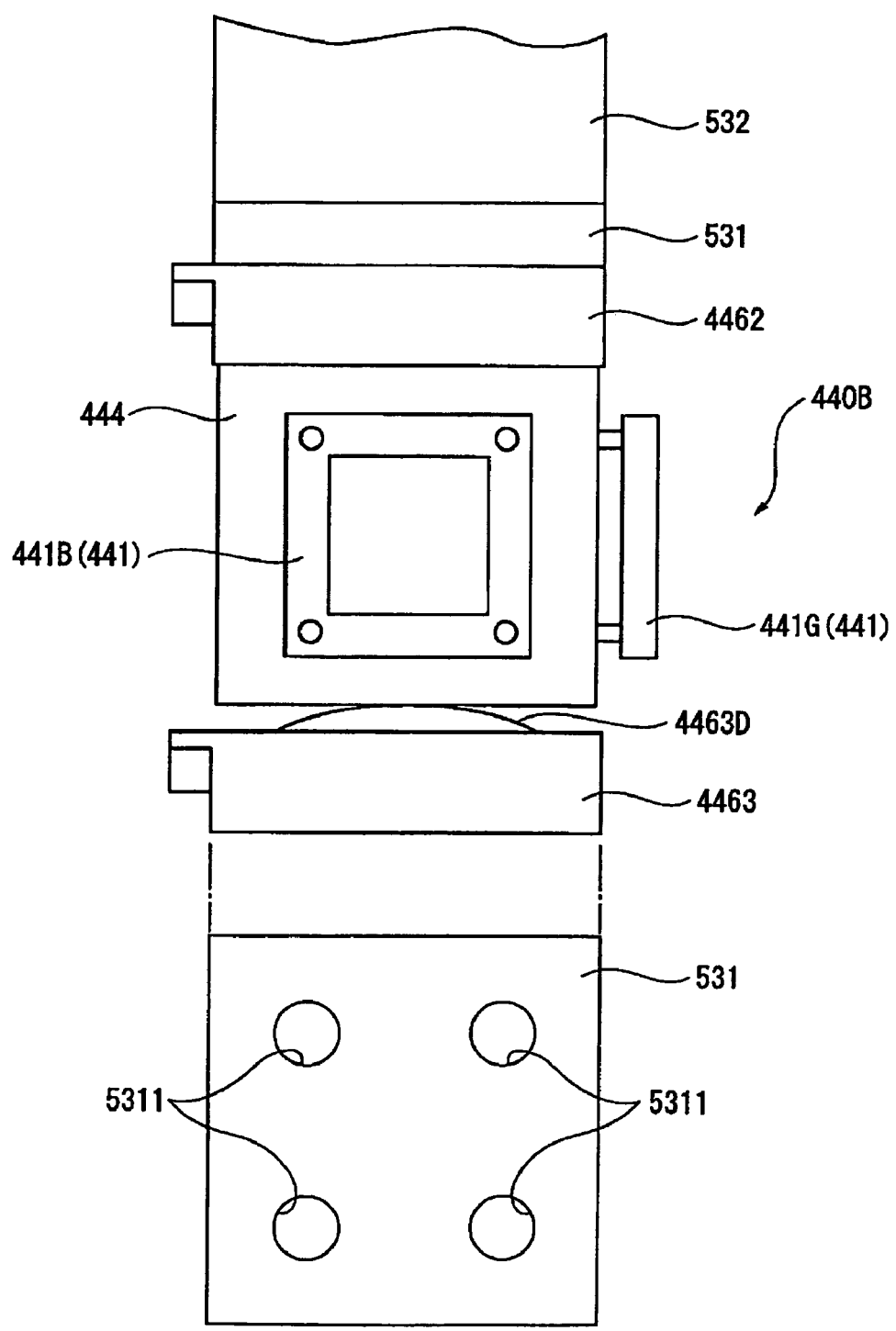
FIG. 9 is an illustration showing the structure of an electro-optic device holder of aforesaid embodiment.

FIG. 9 is an illustration showing the structure of the electro-optic device holder 531.

The electro-optic device holder 531 sucks and holds the upper mount 4462 to be fixed on the upper surface of the cross dichroic prism 444 of the electro-optic device 440B. As shown in FIG. 9, the electro-optic device holder 531 has a flat profile substantially same as the profile of the upper mount 4462 to be held to suck the upper surface of the upper mount 4462 and adjust the position of the electro-optic device 440B connected to the upper mount 4462. Therefore, as shown in FIG. 9, holes 5311 for sucking are formed at the four corners of the electro-optic device holder 531 on the abutting surface with the upper mount 4462.

The driving shaft 532 is driven by a motor or the like for adjusting the posture of the above-described electro-optic device holder 531, and accordingly the driving shaft 532 can three-dimensionally adjust the electro-optic device 440B sucked by the electro-optic device holder 531 to an arbitrary position. As shown in FIG. 8, the driving shaft 532 includes a base 5321 fixed on the platform 3, a planar position adjuster 5322 movably provided on the base 5321, an XZθ position adjuster 5323 provided at the tip end of the planar position adjuster 5322 and a Yθ position adjuster 5324 provided at the tip end of the XZθ position adjuster 5323, the electro-optic device holder 531 being fixed at the tip end of the Yθ position adjuster 5324.

The planar position adjuster 5322 adjusts an advance/retract position and a planar position of the electro-optic device 440B relative to the projection lens 445. As shown in FIG. 8, the planar position adjuster 5322 includes a Z-axis adjuster 5322A provided to slide along a rail 5321A of the base 5321, an engaging member 5322B having a cross-section like a rectangular frame fixed on the Z-axis adjuster 5322A, an X-axis adjuster 5322C provided to slide inside the rectangular frame of the engaging member 5322B, a leg 5322D upstanding on the X-axis adjuster 5322C, a Y-axis adjuster 5322F provided at the upper tip end of the leg 5322D, a connection 5322E connecting the Y-axis adjuster 5322F with the leg 5322D, and a connection 5322G provided on the Y-axis adjuster 5322F to connect the XYθ position adjuster 5323. The Z-axis adjuster 5322A and the X-axis adjuster 5322C are moved in the Z and X-axis directions (FIG. 8) on the platform 3 by a driving mechanism such as a motor (not shown). The Y-axis adjuster 5322F is moved in the Y-axis direction in FIG. 8 relative to the connection 5322E by a driving mechanism such as a motor (not shown).

The XZθ position adjuster 5323 adjusts a rotation position of the electro-optic device 440B relative to the projection lens 445 around the X-axis in FIG. 8 as well as the Z-axis in FIG. 8. The XZθ position adjuster 5323 is fixed at the tip end of the above-described planar position adjuster 5322 and includes a first adjuster 5323A provided to slide roundly in the Z-axis direction, a fan-like adjusting guide 5323C attached to the first adjuster 5323A, and a second adjuster 5323D provided to slide roundly in the X-axis direction along the adjusting guide 5323C. When the unshown motor provided on the upper portion of the first adjuster 5323A is rotated, the first adjuster 5323A slides, and when the unshown motor provided on the upper portion of the second adjuster 5323D is rotated, the second adjuster 5323D slides, so that the rotation position of the electro-optic device 440B can highly accurately be adjusted in an Xθ direction and in a Zθ direction relative to the projection lens 445.

The Yθ position adjuster 5324 adjusts the rotation position of the electro-optic device 440B around the Y-axis in FIG. 8 relative to the projection lens 445. The Yθ position adjuster 5324 is attached to the lower end of the XZθ position adjuster 5323, engaged with the columnar base 5324A through which a hole having the substantially same profile as the Yθ position adjuster 5324 penetrates, and provided to rotate in a circumferential direction of the base 5324A. When the unshown motor provided on the upper portion of the Yθ position adjuster 5324 is rotated, the Yθ position adjuster 5324 rotates, so that the rotation position of the electro-optic device 440B in the Yθ direction can highly accurately be adjusted relative to the projection lens 445.

[Structure of Projection Portion Body]

The projection portion body 6 projects the optical image projected by the optical unit 400 including the optical device body 440A as the adjusting target via the mirror 52. As shown in FIG. 5, the projection portion body 6 includes a screen 61 as an image formation portion and a screen support 62.

Figure 10:
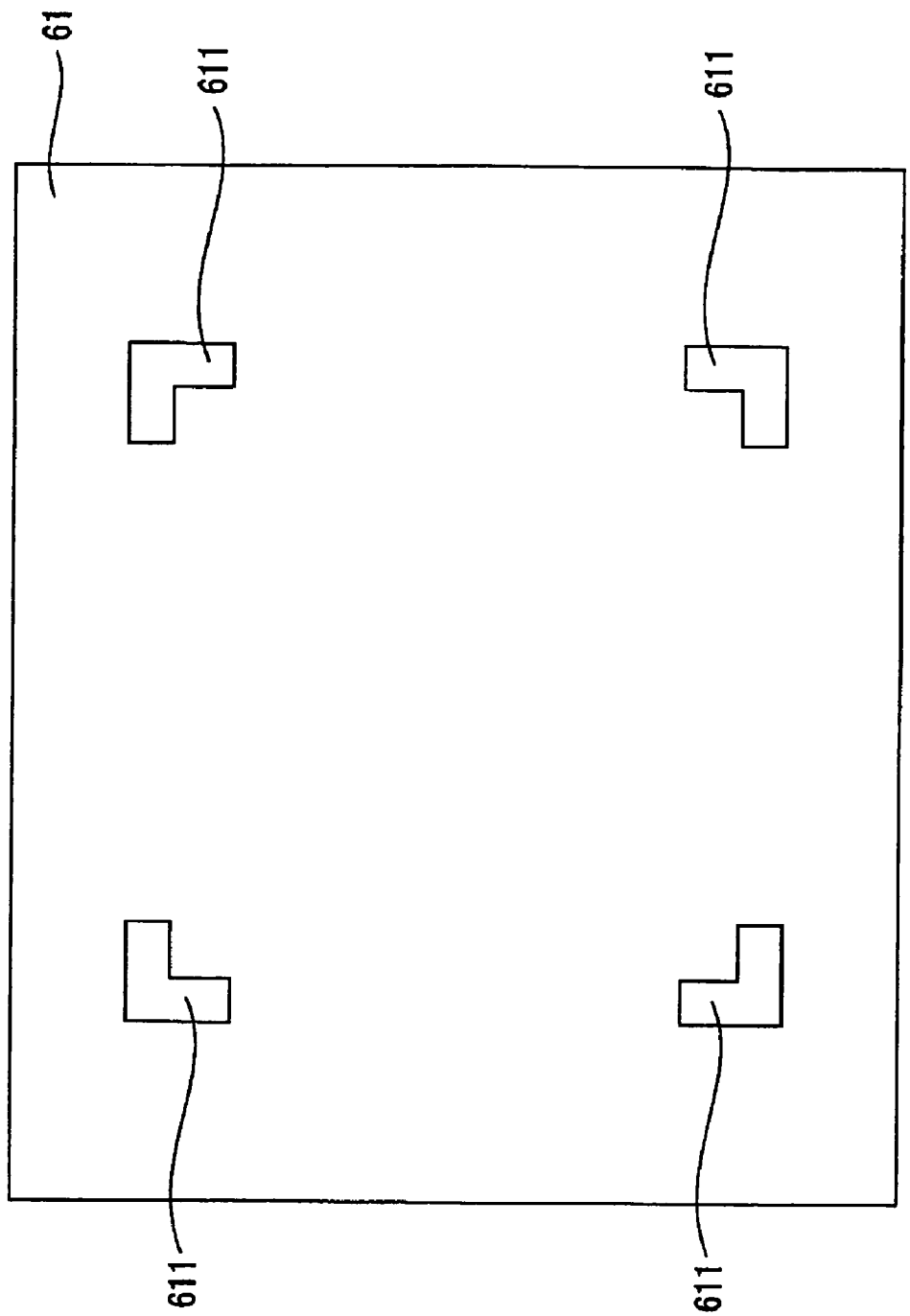
FIG. 10 is a plan view showing the structure of a screen of aforesaid embodiment.

FIG. 10 is a plan view showing the structure of the screen 61.

As shown in FIG. 10, the screen 61 is a typical planar rectangular screen. The screen 61 may be a reflective type screen of which the projection image is viewed from the side of the mirror 52 of the manufacturing apparatus 1, or may be a transmissive screen of which the projection image is viewed from the side opposite to the mirror 52 of the manufacturing apparatus 1.

As shown in FIG. 10, on the projection surface of the screen 61, positioning tapes 611 are attached to form a frame in accordance with the size of the projection surface of the transmissive screen 200 of the rear projector 100. The positioning tapes 611 can be changed in position appropriately according to the model of the rear projector 100, i.e., the size of the projection surface of the transmissive screen 200.

The screen support 62 supports the screen 61, and is fixed on the platform 3 as shown in FIG. 5 or 6.

[Manufacturing Method of Optical Device Body]

Next, a manufacturing method of the optical device body 440A will be described with attached drawings.

Figure 11:
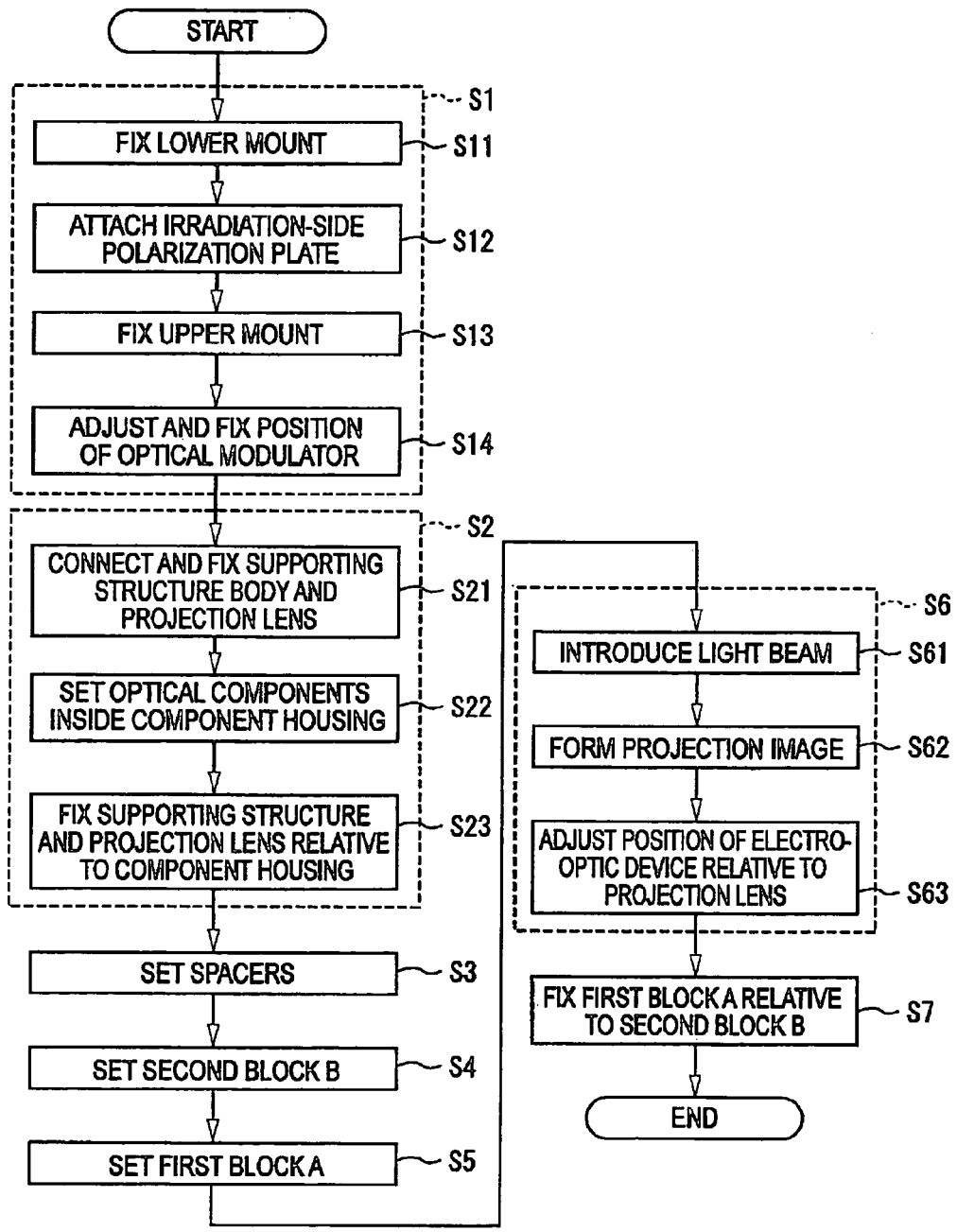
FIG. 11 is a flowchart explaining a manufacturing method of the optical device body of aforesaid embodiment.

FIG. 11 is a flowchart showing the manufacturing method of the optical device body 440A.

First, a first block A including the electro-optic device 440B is assembled (step S1: first block assembling step) as follows.

The position of the cross dichroic prism 444 is adjusted relative to the upper surface of the lower mount 4463 and fixed thereon (step S11).

Specifically, the lower mount 4463 is set inside a positioning device (not shown). A heat-curing adhesive or an ultraviolet-curing adhesive is applied to the bulged portion 4463D of the lower mount 4463, and the lower surface of the cross dichroic prism 444 is abutted on the bulged portion 4463D of the lower mount 4463. While the adhesive being uncured, the position of the cross dichroic prism 444 is adjusted relative to the lower mount 4463. After adjusting the position, the adhesive is cured with hot air, ultraviolet ray or the like to fix the lower mount 4463 and the cross dichroic prism 444. For example, the position of the cross dichroic prism 444 relative to the lower mount 4463 can be adjusted in a way that detects the upper surface of the cross dichroic prism 444 by an optical image detector such as a CCD (Charge Coupled Device), and adjusts the position of a cross defined by the two dielectric multi-layer films of the cross dichroic prism 444 to be a predetermined position based on the detected image. For another example, the position of the cross dichroic prism 444 can be adjusted in a way that introduces the light beam from the light incident surface of the cross dichroic prism 444, and adjusts the position of the cross dichroic prism 444 based on the light beam irradiated by the light irradiation surface.

After step S11, the three irradiation-side polarization plates 443 are respectively adjusted in their postures and attached on the light incident surfaces of the cross dichroic prism 444 (step S12).

Specifically, the posture of the irradiation-side polarization plate 443 may be adjusted in a way that employs an angle adjuster (not shown) to set the unitized lower mount 4463 and cross dichroic prism 444 thereon. Then, an angle adjusting jig included in the angle adjuster holds the irradiation-side polarization plates 443 and the light beam is introduced into each of the irradiation-side polarization plates 443. After this, the light beam passing through a reference polarization plate (not shown) having the substantially same transmission axis as the irradiation-side polarization plates 443, the cross dichroic prism 444 and the incident-side polarization plates 442 is detected. Based on the illuminance and the extinction ratio of the detected light beam, the angle adjusting jig is operated to adjust the posture of the irradiation-side polarization plates 443, and the irradiation-side polarization plates 443 are bonded on the light incident surfaces of the cross dichroic prism 444 with the heat-conductive adhesive etc.

After step S12, the position of the upper mount 4462 is adjusted and fixed on the upper surface of the cross dichroic prism 444 (step S13).

Specifically, the heat-curing adhesive or the ultraviolet-curing adhesive is applied on the upper surface of the cross dichroic prism 444, and the upper mount 4462 is set on the upper surface of the cross dichroic prism 444 with its position being determined by using a positioning jig (not shown). Then, the adhesive is cured with hot air, ultraviolet ray or the like to fix the upper mount 4462 on the cross dichroic prism 444.

After step S13, the three optical modulators 441 are respectively fixed on the light incident surfaces of the cross dichroic prism 444 with the relative positions thereof being adjusted (step S14).

Specifically, a unit in which the upper mount 4462, the cross dichroic prism 444, the three irradiation-side polarization plates 443 and the lower mount 4463 are unitized is set on a liquid crystal panel adjusting/fixing device (not shown). And the ultraviolet-curing adhesive is applied to the outer peripheries of the pins 4413. With the pins 4413 inserted to the holes 4412A of the holder frame 4412, the optical modulators 441 are held by a position adjusting jig of the liquid crystal panel adjusting/fixing device. By operating the position adjusting jig, the ends of the pins 4413 inserted to the holes 4412A of the holder frame 4412 are abutted on the light incident surfaces of the cross dichroic prism 444, so that the optical modulators 441 are set to the cross dichroic prism 444. Then, while the adhesive being uncured, the position adjusting jig is operated to adjust the positions of the optical modulators 441R, 441G and 441B (the liquid crystal panels 4411). After adjusting the positions, the adhesive is cured by irradiating the ultraviolet ray, and the optical modulators 441 are fixed on the cross dichroic prism 444.

The positions of the optical modulators 441R, 441G and 441B are adjusted in a way that introduces the light beam to the liquid crystal panel 4411 of the optical modulator 441G first, passes the light beam through the liquid crystal panels 4411 and the cross dichroic prism 444, and directly detects the four corners of the projection image irradiated by the light irradiation surface of the cross dichroic prism 444 with the four image detectors such as the CCDs or the like. However, the projection image may not directly be detected by the four image detectors. A master lens having typical optical characteristics can be employed to project the projection image irradiated by the light irradiation surface of the cross dichroic prism 444 on the screen and then detect the four corners of the projection image by the four image detectors such as the CCDs or the like. Based on the detected image, the position adjusting jig is operated to adjust a joint between the pins 4413 and the holes 4412A of the holder frame 4412, in other words, to slide the holder frame 4412 relative to the pins 4413, thereby adjusting the focus. Further, the alignment is adjusted according to a joint surface as a sliding surface between the light incident surface of the cross dichroic prism 444 and the pins 4413. When assuming the illumination optical axis A as the Z-axis and the two axes orthogonal to the Z-axis as the X-axis and the Y-axis, the focus adjustment means the adjustment in the Z-axis direction, the rotation direction around the X-axis (namely, X$\theta$ direction), and the rotation direction around the Y-axis (namely, Y$\theta$ direction). The alignment adjustment means the adjustment in the X-axis direction, the Y-axis direction, and the rotation direction in an X-Y plane (namely, $\theta$ direction). After adjusting the position of the optical modulator 441G and fixing the optical modulator 441G on the cross dichroic prism 444, other optical modulators 441R and 441B are adjusted in their positions and fixed in the above-described manner with reference to the optical modulator 441G which has already been adjusted in the position and fixed.

Therefore, the three irradiation-side polarization plates 443, the three optical modulators 441 and the cross dichroic prism 444 are unitized to assemble the electro-optic device 440B, and the first block A is consequently assembled by fixing the upper mount 4462 and the lower mount 4463 on the electro-optic device 440B.

After step S1, a second block B including the projection lens 445 is assembled as follows (step S2: second block assembling step).

The supporting structure body 4461 and the projection lens 445 are connected and fixed by screwing the fixing screws 4465 to the four fixing holes 4452B of the flange 4452 of the projection lens 445 via the four fixing holes 4461B of the supporting structure body 4461 (step S21).

After step S21, the optical components 412 to 415, 421 to 423, 431 to 434 and 442 are housed and disposed inside the component housing 452 (step S22).

After S22, the standing pieces 4452C of the flange 4452 of the projection lens 445 unitized with the supporting structure body 4461 in step S21 is set on the supporting surface of the supporter 452A of the component housing 452, and the projection lens 445 and the supporting structure body 4461 unitized with the component housing 452 are fixed by fixing screws (not shown) (step S23).

As described above, the projection lens 445, the supporting structure body 4461 and the component housing 452 (including the optical components 412 to 415, 421 to 423, 431 to 434 and 442) are unitized to assemble the second block B.

After step S2, the ultraviolet-curing adhesive is applied to the outer peripheries of the four spacers 4464, and the four spacers 4464 are set on the supporter 4461C of the supporting structure body 4461 of the second block B (step S3: spacer setting step). In this state, since the ultraviolet-curing adhesive is applied to the outer peripheries of the spacers 4464, the adhesive is interposed between the spacers 4464 and the supporter 4461 C.

Specifically, the two spacers 4464 are set inside the cutout 4461C1 of the upper supporter 4461C, and the other two spacers 4464 are set inside the cutout 4461C1 of the lower supporter 4461 C. Then, each two spacers 4464 are set on the both ends of the cutout 4461 C1, so that the cross-section areas become smaller as being closer to each other.

After step S3, the second block B in which the four spacers 4464 are set is carried into the manufacturing apparatus 1 via the door (not shown) of the light-shielding cover 2 to be set on the upper surface of the clamp jig 51.

After step S4, the first block A is carried into the manufacturing apparatus 1 via the door (not shown) of the light-shielding cover 2, and the upper mount 4462 of the first block A is sucked and held by the electro-optic device holder 531 of the position adjuster unit 53. Then, the first block A is disposed inside the U-shaped container on the other end side of the component housing 452 of the second block B by driving the driving shaft 532 of the position adjuster unit 53, and the spacer setting portions 4462A, 4463A and the spacer receivers 4462B, 4463B of the upper mount 4462 and the lower mount 4463 of the first block A are abutted on the four spacers 4464 set in the second block B (step S5: first block setting step). At this time, since the ultraviolet-curing adhesive is applied to the outer peripheries of the spacers 4464, the adhesive is interposed between: the spacers 4464; and the spacer setting portions 4462A, 4463A and the spacer receivers 4462B, 4463B of the upper mount 4462 and the lower mount 4463. In this state, the four spacers 4464 are disposed in the vicinity of the four corners on the light irradiation surface of the cross dichroic prism 444.

After step S5, as described below, the position of the electro-optic device 440B of the first block A is adjusted relative to the projection lens 445 of the second block B (step S6).

First, the light source unit 511 is driven and the light source lamp 5111A is lit, so that the light beam is introduced into the component housing 452 of the second block B (step S61: light beam introducing step).

The light beam introduced into the component housing 452 in step S61 is introduced to the optical components 412 to 415, 421 to 423, 431 to 434 and 442 provided inside the component housing 452, and then irradiated on each of the liquid crystal panels 4411 of the optical modulators 441 of the first block A disposed inside the U-shaped container on the other end side of the component housing 452. Then, the optical image is formed by the liquid crystal panels 4411, the irradiation-side polarization plates 443, and the cross dichroic prism 444 of the first block A, projected in an enlarged manner by the projection lens 445 of the second block B, and accordingly, the projection image is formed on the screen 61 of the projection portion body 6 via the mirror 52 of the manufacturing apparatus 1 (step S62: image forming step).

Figure 12:
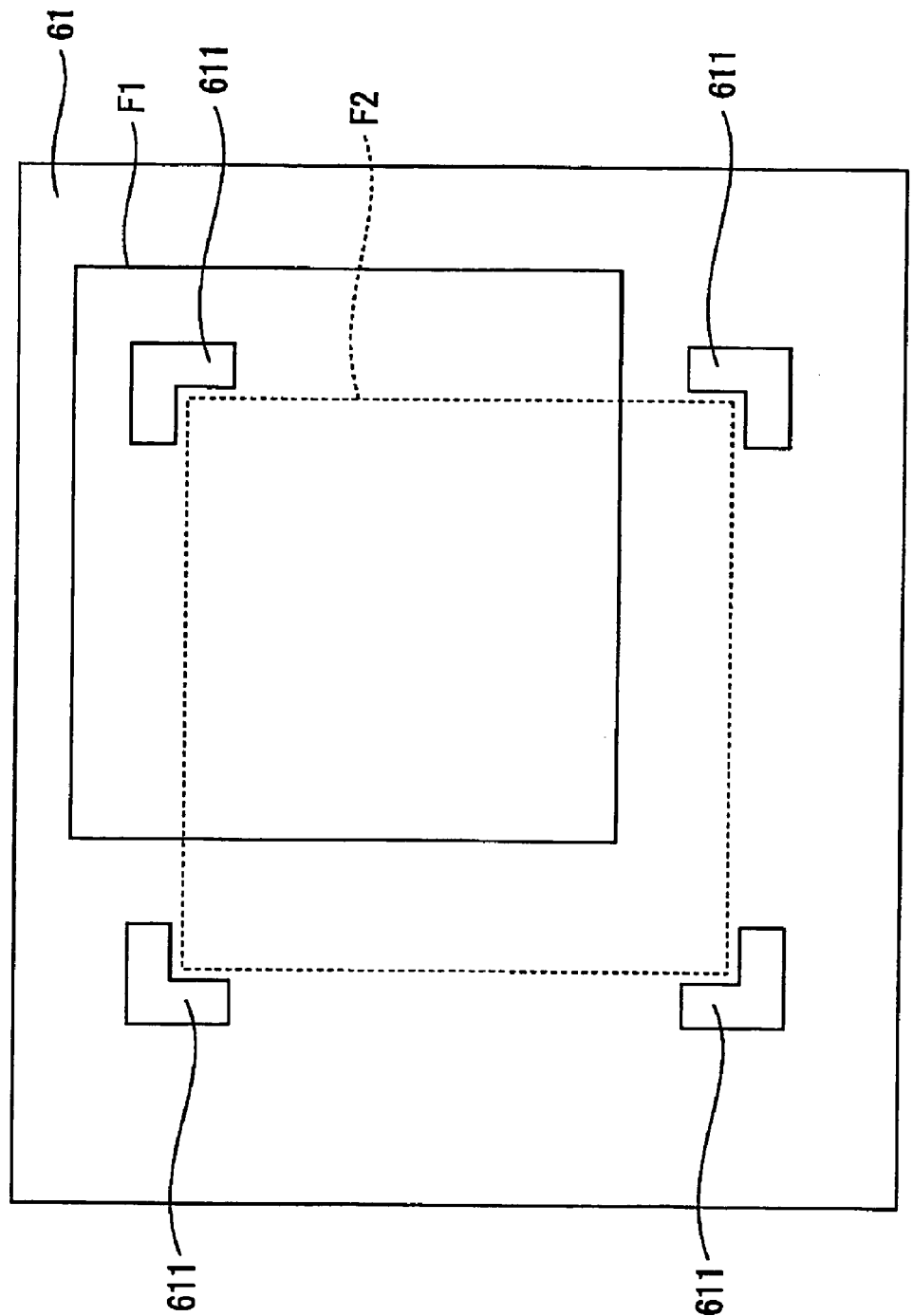
FIG. 12 is an explanatory diagram showing position adjustment of an electro-optic device relative to a projection lens of aforesaid embodiment.

FIG. 12 is an explanatory diagram showing position adjustment of the electro-optic device 440B relative to the projection lens 445.

Incidentally, in the rear projector 100, when the position of the electro-optic device 440B is deviated relative to the projection lens 445, the aspect ratio of the projection image projected from the projection lens 445 on the transmissive screen 200 becomes different, and the projection image cannot entirely be displayed on the projection surface of the transmissive screen 200. In other words, in the above situation, as shown in FIG. 12, a projection image F1 formed on the screen 61 of the projection portion body 6 will be deviated from the frame formed by the positioning tapes 611 on the screen 61 corresponding to the size of the projection surface of the transmissive screen 200.

Owing to this, while the projection image formed in step S62 is checked, the position of the electro-optic device 440B is adjusted relative to the projection lens 445 so that the projection image on the screen 61 fits the frame defined by the positioning tapes 611 (step S63: aspect ratio adjusting step).

Specifically, while the ultraviolet-curing adhesive provided among the first block A, the second block B and the spacers 4464 being uncured, the driving shaft 532 of the position adjuster unit 53 is driven to move the first block A relative to the second block B. Then, the planar position (in the X-axis direction, the Y-axis direction and the Z-axis direction), the rotation position in the X$\theta$ direction (in rotation direction around the X-axis), the rotation position in the Y$\theta$ direction (in rotation direction around the Y-axis), and the rotation position in the Z$\theta$ direction (in rotation direction around the Z-axis direction) of the electro-optic device 440B are adjusted relative to the projection lens 445. By adjusting these positions, as shown in FIG. 12, the electro-optic device 440B is positioned at the optimum position relative to the projection lens 445 so that the projection image F1 is fitted in the frame corresponding to the size of the projection surface of the transmissive screen 200 defined by the positioning tapes 611 on the screen 61, namely, fitted in a projection image F2.

Figure 13:
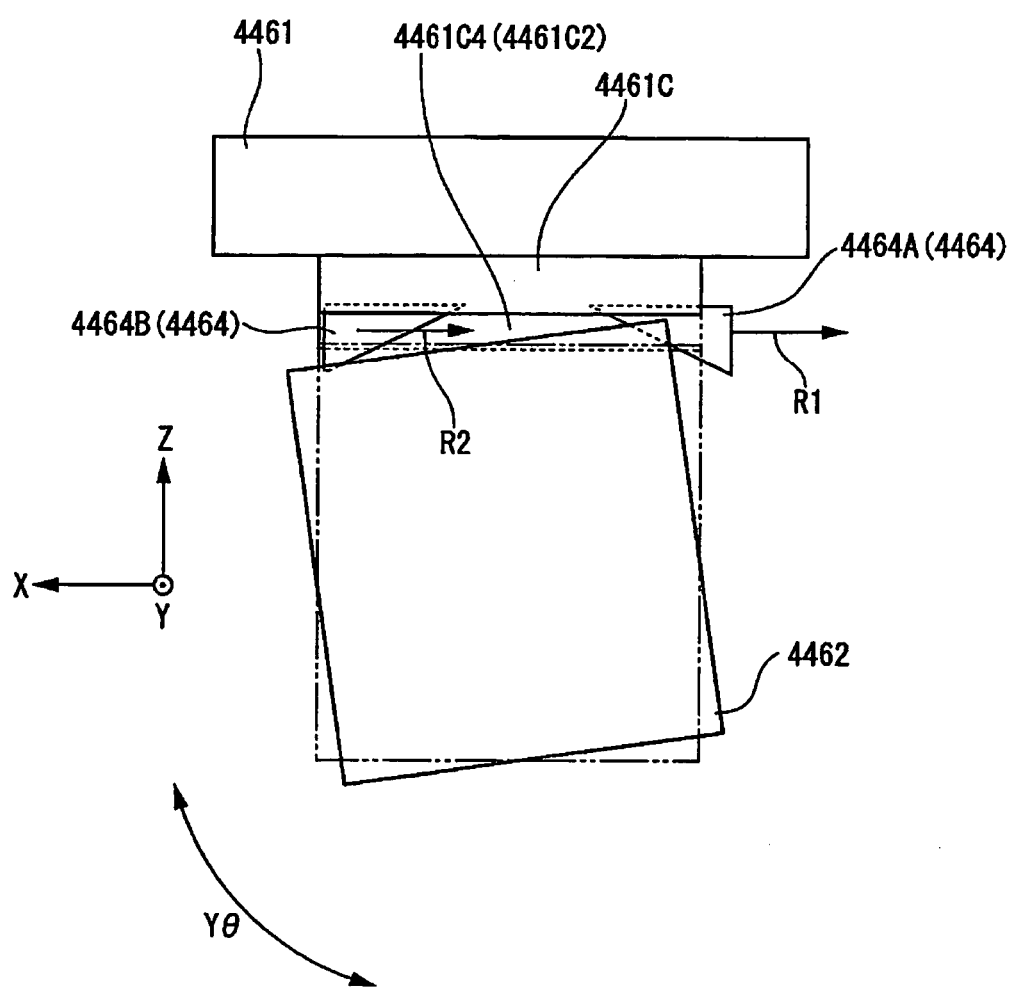
FIG. 13 is an illustration showing movement of spacers when adjusting the position of the electro-optic device relative to the projection lens of aforesaid embodiment.
Figure 14A:
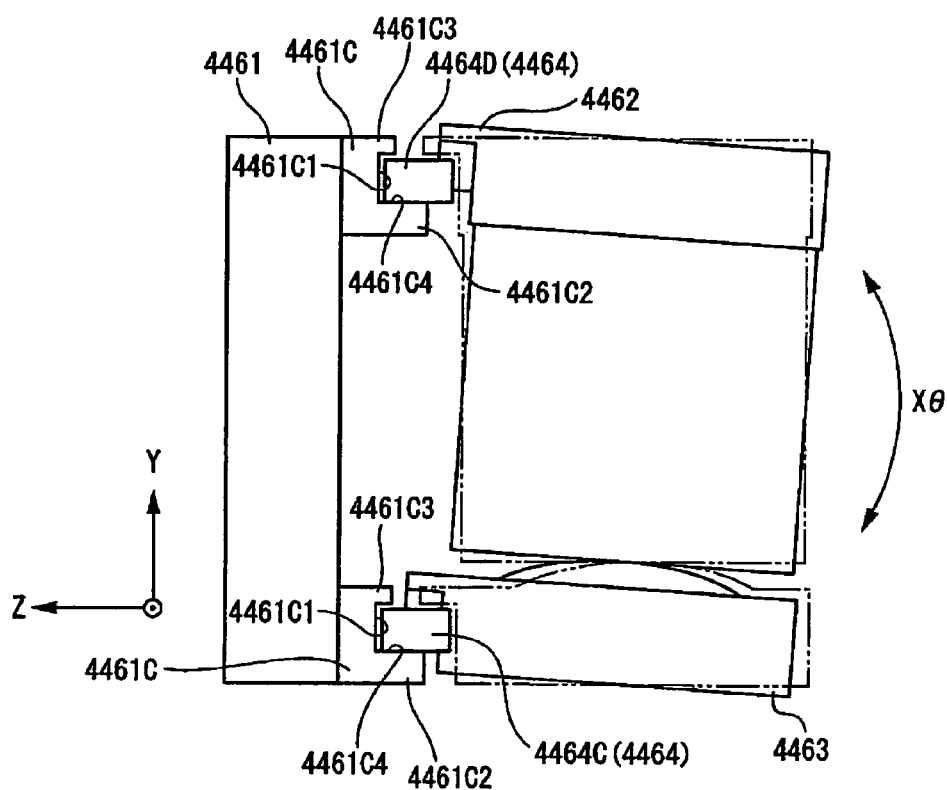
FIGS. 14A and 14B are illustrations each showing movement of the spacers when adjusting the position of the electro-optic device relative to the projection lens of aforesaid embodiment.
Figure 14B:
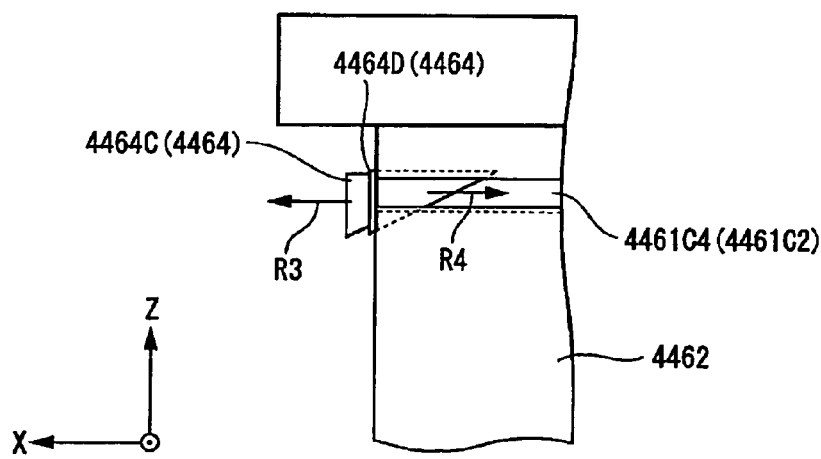

FIGS. 13, 14A and 14B are illustrations each showing movement of the spacers 4464 when adjusting the position of the electro-optic device 440B relative to the projection lens 445. Specifically, FIG. 13 shows the movement of the spacers 4464 when adjusting the rotation position in the Y$\theta$ direction, which is an illustration of the supporting structure body 4461 of the second block B and the first block A as seen from the above. FIGS. 14A and 14B are illustrations each showing the movement of the spacers 4464 when adjusting the rotation position in the X$\theta$ direction. FIG. 14A is an illustration of the supporting structure body 4461 of the second block B and the first block A in side view. FIG. 14B is an illustration partially showing the supporting structure body 4461 of the second block B and the first block A as seen from the above. For simplifying explanation, FIGS. 13, 14A and 14B do not show the optical modulator 441 of the first block A.

When the first block A is moved relative to the second block B in step S63, the four spacers 4464 follow the movement of the first block A relative to the second block B because of the surface tension of the ultraviolet-curing adhesive provided among the first block A, the second block B and the spacers 4464.

For example, when adjusting the rotation position of the electro-optic device 440B in the Y$\theta$ direction relative to the projection lens 445, the spacers 4464 are moved as shown in FIG. 13.

In other words, according to the adjustment of the rotation position in the Y$\theta$ direction, when the end in the X-axis direction of the first block A comes closer to the supporting structure body 4461, a spacer 4464A located near the end is moved to the outside of the first block A and the second block B, i.e. in an arrow RI direction in FIG. 13 along the supporting surface 4461C4 of the supporter 4461C of the supporting structure body 4461. On the other hand, when the end in the X-axis direction of the first block A moves away from the supporting structure body 4461, a spacer 4464B located near the end is moved to the inside of the first block A and the second block B, i.e. in an arrow R2 direction in FIG. 13 along the supporting surface 4461C4 of the supporter 4461C of the supporting structure body 4461.

For example, when adjusting the rotation position of the electro-optic device 440B in the X$\theta$ direction relative to the projection lens 445, the spacers 4464 are moved as shown in FIG. 13.

In other words, according to the adjustment of the rotation position in the Xθ direction, when the end in the Y-axis direction of the first block A comes closer to the supporting structure body 4461, a spacer 4464C located near the end is moved to the outside of the first block A and the second block B, i.e. in an arrow R3 direction in FIG. 14B along the supporting surface 4461C4 of the supporter 4461C of the supporting structure body 4461. On the other hand, when the end in the Y-axis direction of the first block A moves away from the supporting structure body 4461, a spacer 4464D located near the end is moved to the inside of the first block A and the second block B, i.e. in an arrow R4 direction in FIG. 14B along the supporting surface 4461C4 of the supporter 4461C of the supporting structure body 4461.

As described above, since the four spacers 4464 follow the movement of the first block A relative to the second block B, even when the first block A is moved relative to the second block B, the four spacers 4464 will locate between: the spacer receivers 4462B, 4463B of the upper mount 4462 and the lower mount 4463 of the first block A; and the supporting surface 4461 C4 of the supporting structure body 4461 of the second block B.

After step S6, the ultraviolet ray is irradiated on the ultraviolet-curing adhesive provided among the first block A, the second block B and the four spacers 4464, and the adhesive is cured, so that the first block A is fixed relative to the second block B (step S7: adhering and fixing step).

According to the above-described steps, the optical device body 440A is manufactured.

In the above-described first embodiment, since the optical device body 440A includes the support structure 446, the position of the electro-optic device 440B can be adjusted by the supporting structure 446 relative to the projection lens 445. Therefore, since the aspect ratio of the projection image projected by the optical device body 440A in an enlarged manner on the projection surface of the transmissive screen 200 when the manufactured optical device body 440A is assembled with the rear projector 100, the projection image can entirely be displayed on the projection surface of the transmissive screen 200. Owing to this, when manufacturing the electro-optic device 440B, the four image detectors that detect the four corners of the projection image need not to be positioned highly accurately, thereby easily manufacturing the electro-optic device 440B. Further, since the position of the electro-optic device 440B can be adjusted by the supporting structure 446 relative to the projection lens 445, when manufacturing the electro-optic device 440B, the projection lens 445 combined with the electro-optic device 440B need not to be included in the manufacturing target, thereby effectively manufacturing the electro-optic device 440B as an independent component.

Since the spacers 4464 are disposed between: the supporting structure body 4461; and the upper mount 4462 and the lower mount 4463 near the four corners on the light irradiation surface of the cross dichroic prism 444, the position of the electro-optic device 440B can three-dimensionally be adjusted in the X-axis direction, the Y-axis direction, the Z-axis direction, the rotation direction around the X-axis, the rotation direction around the Y-axis and the rotation direction around the Z-axis. Therefore, the aspect ratio of the projection image can easily be adjusted according to the projection surface of the transmissive screen 200.

Since the projections 4461C2 having the supporting surfaces 4461C4 are formed on the supporting structure body 4461, the spacers 4464 can easily be set when the optical device body 440A is manufactured. Since the projections 4461C3 are formed on the supporting structure body 4461, the spacers 4464 are unlikely dropped from the supporting surfaces 4461C4 even when the position of the electro-optic device 440B is adjusted relative to the projection lens 445 after the spacers 4464 are set between the projections 4461C2 and 4461C3. Therefore, the position of the electro-optic device 440B can smoothly be adjusted relative to the projection lens 445.

Since the spacers 4464 are triangle columns that are disposed such that a column axis direction thereof is orthogonal to the supporting surface 4461 C4 and the cross-section areas of the two spacers 4464 disposed on the supporting surface 4461C4 gradually become smaller as coming closer to each other. The spacer setting portions 4462A, 4463A are formed on the upper mount 4462 and the lower mount 4463. Therefore, the position of the electro-optic device 440B can smoothly and three-dimensionally be adjusted relative to the projection lens 445.

Since the spacers 4464 are set while the ultraviolet-curing adhesive being applied to the outer peripheries of the spacers 4464, the spacers 4464 can follow the movement of the upper mount 4462 and the lower mount 4463 due to the surface tension of the adhesive when the position of the electro-optic device 440B is adjusted relative to the projection lens 445. Accordingly, even when the first block A is moved relative to the second block B, the four spacers 4464 can surely be positioned between: the spacer receivers 4462B, 4463B of the upper mount 4462 and the lower mount 4463 of the first block A; and the supporting surfaces 4461C4 of the supporting structure body 4461 of the second block B. Therefore, by curing the adhesive after the position is adjusted, the fixture between the supporting structure body 4461 and the upper mount 4462 as well as the lower mount 4463 can preferably be conducted via the spacers 4464.

Since the spacer receivers 4462B and 4463B are formed on the upper mount 4462 and lower mount 4463, the spacers 4464 are sandwiched between: the spacer receivers 4462B, 4463B of the upper mount 4462 and the lower mount 4463; and the supporting surfaces 4461C4 of the supporting structure body 4461, so that the fixing state between: the supporting structure body 4461; and the upper mount 4462 and the lower mount 4463 via the spacers 4464 can preferably be maintained. Therefore, after manufacturing the optical device body 440A, the state where the electro-optic device 440B is disposed at the optimum position can preferably be maintained.

Since the bulged portion 4463D is formed on the upper surface of the lower mount 4463, by setting the lower mount 4463 on the cross dichroic prism 444 when manufacturing the electro-optic device 440B, the position of the cross dichroic prism 444 can be adjusted by tilting in the vertical direction, thus easily and appropriately manufacturing the electro-optic device 440B. By fixing the lower mount 4463 when manufacturing the electro-optic device 440B, a step for fixing the lower mount 4463 on the cross dichroic prism 444 can be omitted when unitizing the projection lens 445 and the electro-optic device 440B, thereby quickly manufacturing the electro-optic device.

Since the optical device body 440A is manufactured with the standing pieces 4452C of the flange 4452 of the projection lens 445 being fixed with the supporter 452A of the component housing 452, the position of the optical device body 440A is unlikely deviated relative to the optical component casing 450 due to manufacturing error of the optical device body 440A and the optical component casing 450 in compared to a configuration in which the optical device body 440A is fixed in the optical component casing 450 after the optical device body 440A is separately manufactured. Therefore, the aspect ratio of the projection image projected from the optical device body 440A can further preferably be corresponded to the projection surface of the transmissive screen 200, thus surely displaying the projection image on the entire projection surface of the transmissive screen 200.

Second Embodiment

Next, a second embodiment of the invention will be described below with reference to the attached drawings.

Figure 15:
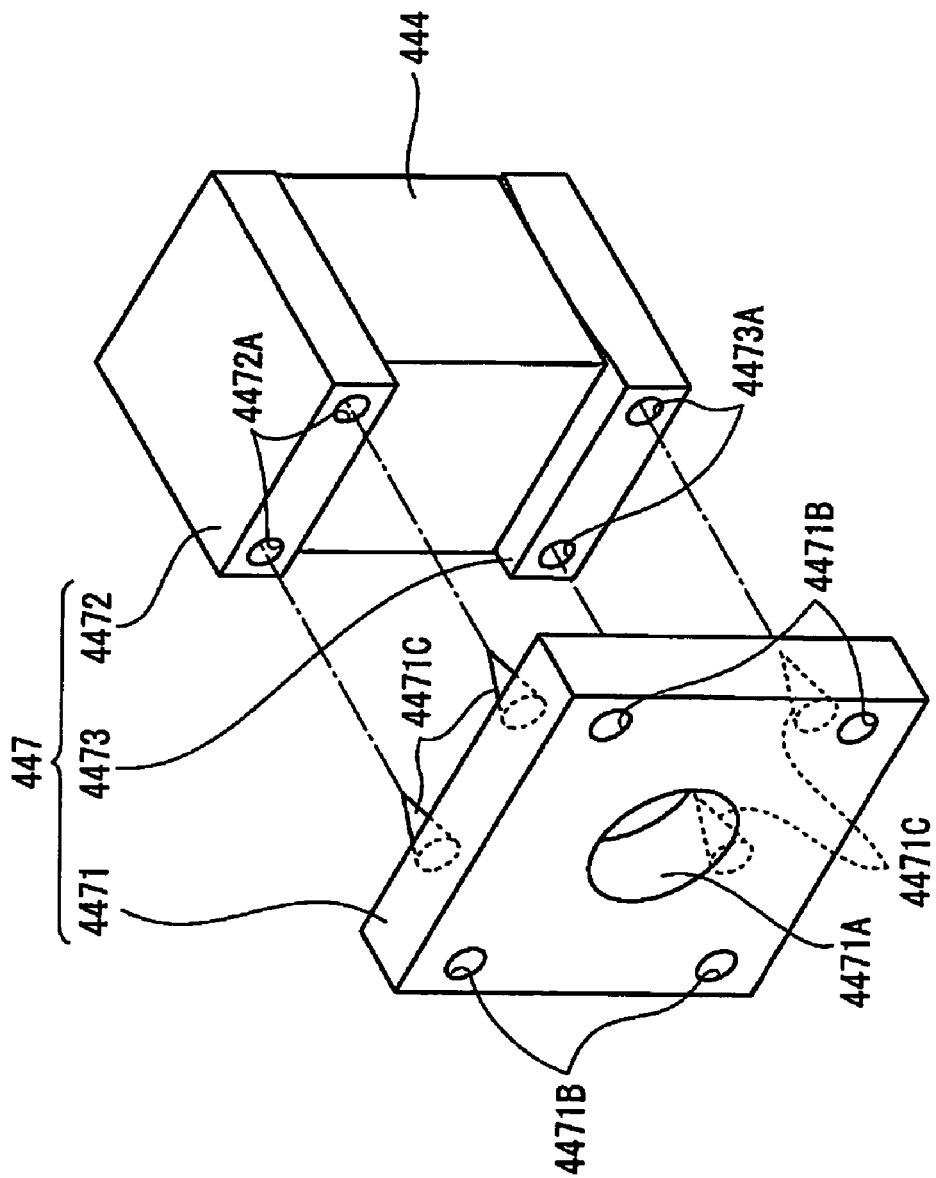
FIG. 15 is an exploded perspective view showing the structure of a supporting structure according to a second embodiment.

FIG. 15 is an exploded perspective view showing the structure of a supporting structure 447 according to the second embodiment.

In the present embodiment, the structure of the supporting structure 447 is different from that of the supporting structure 446 described in the first embodiment. Other configurations of the optical device body 440A, the rear projector 100 and the manufacturing apparatus 1 are the same as that in the first embodiment.

The supporting structure 447 unitizes the projection lens 445 and the electro-optic device 440B in the same manner as the supporting structure 446 described in the first embodiment. As shown in FIG. 15, the supporting structure 447 includes a supporting structure body 4471, an upper mount 4472 and a lower mount 4473.

As shown in FIG. 15, the supporting structure body 4471 is formed by a planar rectangle like the supporting structure body 4461 described in the first embodiment, and has an opening 4471A and four fixing holes 4471B like the opening 4461A and the four fixing holes 4461B of the supporting structure body 4461.

As shown in FIG. 15, formed on a light incident surface of the supporting structure body 4471 are four pin projections 4471C at positions near the four corners of the light-irradiation surface of the cross dichroic prism 444 to be connected to the upper mount 4472 and the lower mount 4473 as spacers projecting toward the light incident side.

As shown in FIG. 15, the pin projections 4471C each have a profile of which the cross-section area being smaller from the base end to the tip end.

As shown in FIG. 15, the upper mount 4472 is a rectangular parallelepiped as the upper mount 4462 described in the first embodiment.

As shown in FIG. 15, two pin insertion holes 4472A are formed in the upper mount 4472 as spacer insertion holes in an end surface facing to the supporting structure body 4471 at positions corresponding to the two pin projections 4471C on the upper side of the supporting structure body 4471.

The lower mount 4473 substantially has the same profile as the upper mount 4472, and has two pin insertion holes 4473A similar to the two pin insertion holes 4472A of the upper mount 4472. Though not shown, a bulged portion is formed on the upper surface of the lower mount 4473, the bulged portion being similar to the bulged portion 4463D formed on the upper surface of the lower mount 4463 in the first embodiment.

While the ultraviolet-curing adhesive is applied to the outer peripheries of the four pin projections 4471C of the supporting structure body 4471, by inserting the pin projections 4471C to the pin insertion holes 4472A, 4473A of the upper mount 4472 and the lower mount 4473, the upper mount 4472 and the lower mount 4473 are fixed on the supporting structure body 4471. That is, the present embodiment is only different in the connection structure between: the supporting structure body 4471; and the upper mount 4472 and the lower mount 4473 as mentioned before. Therefore, the manufacturing method of the optical device body 440A is similar to that described in the first embodiment, thus omitting the description.

In the above-described second embodiment, in compared to the first embodiment, since the four pin projections 4471C are provided on the supporting structure body 4471 as spacers, the spacer setting step S3 can be omitted when manufacturing the optical device body 440A, thereby quickly manufacturing the optical device body 440A. Since the pin insertion holes 4472A are formed in the upper mount 4472 and the lower mount 4473, the position of the electro-optic device 440B can smoothly be adjusted relative to the projection lens 445 with the pin projections 4471C are inserted to the pin insertion holes 4472A and 4473A. The positions of the pin projections 4471C are unlikely deviated relative to the supporting structure body 4471, so that the electro-optic device 440B can be disposed and maintained preferably at the optimum position relative to the projection lens 445 after the optical device body 440A is manufactured.

Since the pin projections 4471C each have a cross-section area being gradually smaller toward the tip end from the base end, the tip ends of the pin projections 4471C hardly interfere with the inner surfaces of the pin insertion holes 4472A and 4473A mechanically when the position of the electro-optic device 440B is adjusted relative to the projection lens 445, thereby smoothly adjusting the position of the electro-optic device 440B relative to the projection lens 445.

The preferable embodiments of the invention has been described above, however, the scope of the invention is not restricted to the above-described embodiments, but includes modifications and improvements as long as the object of the invention can be achieved.

The supporting structure 446, 447 may not be the structure described in the above-described embodiments, and the profiles of the supporting structure body 4461, 4471, the upper mount 4462, 4472 and the lower mount 4463, 4473 may be different from the one described in the respective embodiments as long as the spacers 4464 and the pin projections 4471C interposed between: the supporting structure body 4461, 4471; and the upper mount 4462, 4472 and the lower mount 4463, 4473 are disposed near the four corners of the light irradiation surface of the cross dichroic prism 444. The profiles of the spacers 4464 and the pin projections 4471C may be different from the one described in the respective embodiments. Additionally, the supporting structure body may employ such configuration described below.

Figure 16:
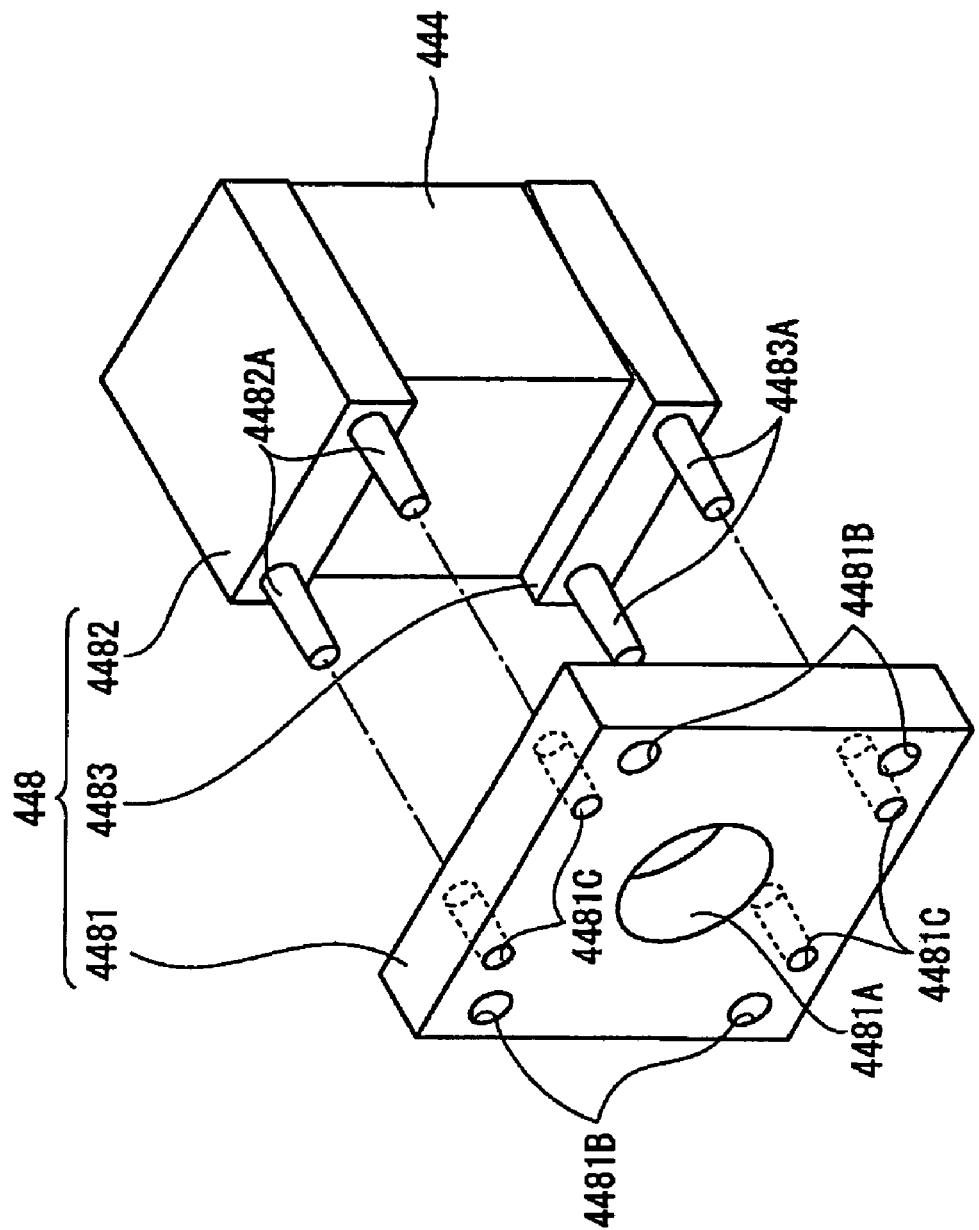
FIG. 16 is an exploded perspective view showing a modification of the supporting structure of aforesaid embodiment.

FIGS. 16 and 17 are exploded perspective views showing modifications of the supporting structure body.

For example, a supporting structure 448 shown in FIG. 16 has such configuration described below.

As shown in FIG. 16, the supporting structure 448 includes a supporting structure body 4481, an upper mount 4482 and a lower mount 4483.

As shown in FIG. 16, the supporting structure body 4481 is formed by a planar rectangle like the supporting structure body 4461 described in the first embodiment, and has an opening 4481A and four fixing holes 4481B like the opening 4461A and the four fixing holes 4461B of the supporting structure body 4461.

As shown in FIG. 16, four pin insertion holes 4481C are formed as spacer insertion holes in the supporting structure body 4481 near the four corners of the light irradiation surface of the cross dichroic prism 444 at the positions where the upper mount 4482 and the lower mount 4483 are connected Note that, the pin insertion holes 4481C each may be a recess dented in the light incident surface instead of the profile penetrating from the light incident surface to the light irradiation surface.

As shown in FIG. 16, the upper mount 4482 and the lower mount 4483 are rectangular parallelepiped like the upper mount 4462 and the lower mount 4463 described in the first embodiment.

As shown in FIG. 16, respectively formed in the end surfaces of the upper mount 4482 and the lower mount 4483 facing to the supporting structure body 4481 are two pin projections 4482A and two pin projections 4483A as spacers projecting toward the supporting structure body 4481 at the positions corresponding to the four pin insertion holes 4481C of the supporting structure body 4481.

As shown in FIG. 16, the pin projections 4482A and 4483A each have a profile of which the cross-section area being smaller from the base end to the tip end.

Though not shown, a bulged portion is formed on the upper surface of the lower mount 4483, the bulged portion being similar to the bulged portion 4463D formed on the upper surface of the lower mount 4463 in the first embodiment.

While the ultraviolet-curing adhesive is applied to the outer peripheries of the pin projections 4482A and 4483A of the upper mount 4482 and the lower mount 4483, the upper mount 4482 and the lower mount 4483 are fixed on the supporting structure body 4481 by respectively inserting the pin projections 4482A and 4483A to the pin insertion holes 4481 C of the supporting structure body 4481.

For another example, a supporting structure 449 shown in FIG. 17 has such configuration described below.

As shown in FIG. 17, the supporting structure 449 includes a supporting structure body 4491 and four spacers 4494 (only three spacers being shown in FIG. 17) in addition to the upper mount 4472 (including the pin insertion holes 4472A) and the lower mount 4473 (including the pin insertion holes 4473A) described in the second embodiment.

As shown in FIG. 17, the supporting structure body 4491 is formed by a planar rectangle like the supporting structure body 4461 described in the first embodiment, and has an opening 4491A and four fixing holes 4491B like the opening 4461A and the four fixing holes 4461B of the supporting structure body 4461.

As shown in FIG. 17, four recesses 4491 C are formed as spacer insertion holes on the light incident surface of the supporting structure body 4491 near the four corners of the light incident surface of the cross dichroic prism 444 at the positions corresponding to the respective pin insertion holes 4472A and 4473A of the upper mount 4472 and the lower mount 4473. The recesses 4491 C may penetrate toward the light irradiation surface.

As shown in FIG. 17, the four spacers 4494 are formed with ultraviolet-transmissive member (for example, acrylic resin) substantially in a columnar profile, with the cross-section area thereof being smaller toward the both ends from the center. As shown in FIG. 17, the both ends of the four spacers 4494 are inserted to the four recesses 4491C of the structure supporting body 4491 and the pin insertion holes 4472A and 4473A of the upper mount 4472 and the lower mount 4473.

While the ultraviolet-curing adhesive is applied to the outer peripheries of the four spacers 4494, the upper mount 4472 and the lower mount 4473 are fixed on the supporting structure body 4491 by respectively inserting the both ends of the four spacers 4494 to the four recesses 4491C as well as the pin insertion holes 4472A and 4473A of the upper mount 4472 and the lower mount 4473.

Note that the spacers 4464 described in the first embodiment may be formed with the ultraviolet-transmissive member (for example, acrylic resin) like the above-described spacers 4494.

In the examples shown in FIGS. 16 and 17, the optical device body 440A may be manufactured by a manufacturing method similar to that described in the first and second embodiments.

In the respective embodiments and the examples shown in FIGS. 16 and 17, the manufacturing method of the optical device body 440A may not be conducted according to the flowchart shown in FIG. 11, and may employ other methods. For example, the order of the first block assembling step S1 and the second block assembling step S2 may be reversed. For example, steps S22 and S23 may be omitted in the second block assembling step S2, and only the unitized supporting structure body 4461, 4471, 4481, 4491 and the projection lens 445 may be set on the clamp jig 51 in the second block setting step S4. For example, the spacer setting step S3, the second block setting step S4, and the first block setting step S5 may not be conducted in that order. After the second block setting step S4 is conducted, the first block setting step S5 may be conducted, and then, the spacer setting step S3 may be conducted. For example, in the spacer setting step S3, a heat-curing adhesive may be used instead of the ultraviolet-curing adhesive.

In the respective embodiments and the examples shown in FIGS. 16 and 17, in the aspect ratio adjusting step S63, the position adjuster unit 53 is driven while the projection image projected on the screen 61 in the image forming step S62 is checked with eyes, it is not limited thereto. For example, such configuration may be employed that the projection image projected on the screen 61 is detected by the image detector such as a CCD, the detected projection image is displayed on the monitor, and the position adjuster unit 53 is driven while the projection image displayed on the monitor is checked. Or, the projection image detected by the image detector such as the CCD may be processed with an arithmetic processing unit such as a computer, so that the position adjuster unit 53 is automatically controlled based on the processing result. With this configuration, the optical device body 440A can highly accurately and quickly be manufactured.

In the respective embodiments and the examples shown in FIGS. 16 and 17, when manufacturing the optical device body 440A, the optical image projected by the optical device body 440A in an enlarged manner is reflected by the mirror 52 and then projected on the screen 61, it is not limited thereto. For example, the mirror 52 can be omitted, and the screen 61 is disposed at the position corresponding to the mirror 52, so that the optical image projected by the optical device body 440A in an enlarged manner can directly be projected on the screen 61.

In the respective embodiments and the examples shown in FIGS. 16 and 17, in the first block setting step S5, the upper surface of the upper mount 4462, 4472, 4482 is sucked and held by the electro-optic device holder 531 of the position adjuster unit 53, it is not limited thereto.

For example, a recess for engagement is provided in the upper mount 4462, 4472, 4482. And, a claw that can engage with the recess is provided on the position adjuster unit 53. Then, the recess of the upper mount 4462, 4472, 4482 is held by the claw of the position adjuster unit 53.

In the first embodiment, since the spacer receivers 4462B, 4463B are formed on both of the upper mount 4462 and the lower mount 4463, spacer receivers may be formed on at least one of the upper mount 4462 and the lower mount 4463.

In the respective embodiments and the examples in FIGS. 16 and 17, the description was about the optical device body 440A of the rear projector 100, the optical device body 440A may be applied to a front projector. In the respective embodiments, although there are three optical modulators 441, it is not limited thereto as long as there are provided two or more optical modulators.

Although the best configuration for implementing the invention is disclosed above, the invention is not restricted thereto. That is, the invention is mainly illustrated and described on the specific embodiment, however, a person skilled in the art can modify the specific configuration such as shape, material, quantity on the above-described embodiment as long as a technical idea and an advantage of some aspects of the invention can be achieved.

Therefore, the description that limits the shape and the material is only the example to make the invention easily understood, but does not intend to limit the invention, so that the invention includes the description using a name of component without a part of or all of the limitation on the shape and the material etc.

The priority applications No. JP2004-242803 and No. JP2005-168441 upon which this patent application is based are hereby incorporated by reference.

What is claimed is:

1. An optical device, comprising:
   an electro-optic device including a plurality of optical modulators that modulate a plurality of color lights in accordance with image information, and a color-combining optical device that has a plurality of light incident surfaces where the plurality of optical modulators are attached and combines the color lights respectively modulated by the plurality of optical modulators to form an optical image;
   a projection optical device that projects the optical image formed by the electro-optic device in an enlarged manner; and
   a supporting structure that unitizes the electro-optic device and the projection optical device,
   the supporting structure including:
   a supporting structure body having an opening for passing the optical image irradiated from the electro-optic device and attached to a base end of the projection optical device;
   mounts respectively fixed on end surfaces intersecting the plurality of light incident surfaces of the color-combining optical device; and
   spacers interposed between the supporting structure body and the mounts, wherein
   a light irradiation surface of the color-combining optical device is a planar rectangle, and
   the spacers are respectively disposed between the supporting structure body and the mounts near four corners of light irradiation surfaces of the color-combining optical device.

2. The optical device according to claim 1, wherein
   projections are formed on a light incident surface of the supporting structure body so that the projections project on the light incident surface toward a light incident side at positions corresponding to the mounts, the projections having supporting surfaces for respectively supporting two of the spacers,
   the spacers are formed in triangle columns so that a column axis direction is orthogonal to a supporting surface of the supporting surfaces and cross-section areas of the two spacers supported by the supporting surface become smaller as the spacers come closer to each other, and
   the mounts are chamfered at respective corners near the four corners of the color-combining optical device of an end facing the supporting structure body and respectively have spacer setting portions where the spacers are set.

3. The optical device according to claim 2, wherein spacer receivers are respectively formed on the mounts, the spacer receivers being projected from the spacer setting portions and allowing the spacers to be sandwiched between the spacer receivers and the supporting surface of the supporting structure body.

4. The optical device according to claim 1, wherein
   the spacers are formed with pin projections integrally formed on one of the supporting structure body and the mount and projected toward an other one of the supporting structure body and the mount, and
   spacer insertion holes are respectively formed in the other one of the supporting structure body and the mount at positions corresponding to the spacers so that the spacers can be inserted through the spacer insertion holes in a loosely fitted manner.

5. The optical device according to claim 4, wherein the spacer has a cross-section area gradually becoming smaller to a tip end from a base end.

6. The optical device according to claim 1, wherein a bulged portion is formed on one of the mounts respectively set on the end surfaces intersecting the plurality of light incident surfaces of the color-combining optical device substantially at a center of a fixture surface fixed to the color-combining optical device, the bulged portion being bulged from the fixture surface.

7. A projector, comprising:
   a light source device;
   an optical device,
   the optical device including:
   an electro-optic device having a plurality of optical modulators that modulate a plurality of color lights irradiated by the light source device in accordance with image information and a color-combining optical device that has a plurality of light incident surfaces where the plurality of optical modulators are attached and combines the color lights respectively modulated by the plurality of optical modulators to form an optical image; and
   a projection optical device that projects an optical image formed by the electro-optic device in an enlarged manner; and
   a supporting structure including:
   a supporting structure body having an opening for passing the optical image irradiated from the electro-optic device and attached to a base end of the projection optical device,
   mounts respectively fixed on end surfaces intersecting the plurality of light incident surfaces of the color-combining optical device, and
   spacers interposed between the supporting structure body and the mounts, wherein:
   a light irradiation surface of the color-combining optical device is a planar rectangle, and
   the spacers are respectively disposed between the supporting structure body and the mounts near four corners of light irradiation surfaces of the color-combining optical device.

8. The projector according to claim 7, further comprising:
a boxy exterior casing that houses the light source device and the optical device; and
a transmissive screen exposed on one of lateral surfaces of the exterior casing for projecting an optical image formed by the optical device.

9. The projector according to claim 7, wherein
projections are formed on a light incident surface of the supporting structure body so that the projections project on the light incident surface toward a light incident side at positions corresponding to the mounts, the projections having supporting surfaces for respectively supporting two of the spacers,
the spacers are formed in triangle columns so that a column axis direction is orthogonal to the supporting surface and cross-section areas of the two spacers supported by the supporting surface become smaller as the spacers come closer to each other, and
the mounts are chamfered at respective corners near the four corners of the color-combining optical device of an end facing the supporting structure body and respectively have spacer setting portions where the spacers are set.

10. The projector according to claim 7, wherein spacer receivers are respectively formed on the mounts, the spacer receivers being projected from spacer setting portions and allowing the spacers to be sandwiched between the spacer receivers and a supporting surface of the supporting structure body.

11. The projector according to claim 7, wherein
the spacers are formed with pin projections integrally formed on one of the supporting structure body and the mount and projected toward an other one of the supporting structure body and the mount, and
spacer insertion holes are respectively formed in the other one of the supporting structure body and the mount at positions corresponding to the spacers so that the spacers can be inserted through the spacer insertion holes in a loosely fitted manner.

12. The projector according to claim 7, wherein the spacer has a cross-section area gradually becoming smaller to a tip end from a base end.

13. The optical device according to claim 7, wherein a bulged portion is formed on one of the mounts respectively set on the end surfaces intersecting the plurality of light incident surfaces of the color-combining optical device substantially at a center of a fixture surface fixed to the color-combining optical device, the bulged portion being bulged from the fixture surface.

14. A manufacturing method of an optical device for manufacturing the optical device,
the optical device including:
an electro-optic device having a plurality of optical modulators that modulate a plurality of color lights in accordance with image information, and a color-combining optical device that has a plurality of light incident surfaces where the plurality of optical modulators are attached and combines the color lights respectively modulated by the plurality of optical modulators to form an optical image;
a projection optical device that projects an optical image formed by the electro-optic device in an enlarged manner; and
a supporting structure that unitizes the electro-optic device and the projection optical device,
the supporting structure including:
a supporting structure body having an opening for passing the optical image irradiated from the electro-optic device and attached to a base end of the projection optical device;
mounts respectively fixed on end surfaces intersecting the plurality of light incident surfaces of the color-combining optical device; and
four triangle columnar spacers interposed between the supporting structure and the mounts, wherein
projections are formed on a light incident surface of the supporting structure body so that the projections project on the light incident surface toward a light incident side at positions corresponding to the mounts, the projections having supporting surfaces for respectively supporting two of the four spacers, and
the mounts are chamfered at respective corners near four corners on a planar rectangular light irradiation surface of the color-combining optical device and respectively have spacer setting portions where the spacers are set,
the method, comprising the steps of:
a first block assembling step for assembling a first block by unitizing the plurality of optical modulators, the color-combining optical device and the mounts;
a second block assembling step for assembling a second block by unitizing the projection optical device and the supporting structure body;
a spacer setting step for, while a heat-curing adhesive or a light-curing adhesive is applied to outer peripheries of the four spacers, setting the four spacers respectively on the supporting surfaces of the projections of the supporting structure body of the second block so that the column axis direction of the four spacers is orthogonal to the supporting surfaces and cross-section areas thereof gradually become smaller as the two spacers come closer to each other on the supporting surfaces;
a second block setting step for setting the second block at a predetermined position;
a first block setting step for holding the first block with an aspect ratio adjusting jig and setting the first block so that the four spacers are respectively abutted on the spacer setting portions of the mounts of the first block on the light incident side of the supporting structure body of the second block;
a light beam introducing step for introducing a light beam to the plurality of optical modulators of the first block;
an image forming step for projecting an optical image which is combined by the color-combining optical device via the plurality of optical modulators and projected by projection optical device of the second block on an image formation portion in an enlarged manner to form a projection image;
an aspect ratio adjusting step for adjusting a position of the electro-optic device of the first block relative to the projection optical device of the second block by moving the aspect ratio adjusting jig according to the projection image formed by the image forming step; and
an adhering and fixing step for fixing the supporting structure body and the mounts via the spacers by curing the heat-curing adhesive or the light-curing adhesive after the aspect ratio adjusting step.

* * * * *